US010606403B2

(12) United States Patent
Ishizaki et al.

(10) Patent No.: US 10,606,403 B2
(45) Date of Patent: Mar. 31, 2020

(54) DETECTION DEVICE

(71) Applicant: Japan Display Inc., Tokyo (JP)

(72) Inventors: Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/356,559

(22) Filed: Mar. 18, 2019

(65) Prior Publication Data

US 2019/0212870 A1  Jul. 11, 2019

Related U.S. Application Data

(63) Continuation of application No. 15/281,720, filed on Sep. 30, 2016, now Pat. No. 10,275,074.

(30) Foreign Application Priority Data

Nov. 20, 2015  (JP) ................................. 2015-228026

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04107* (2013.01); *G06F 2203/04108* (2013.01); *G06F 2203/04112* (2013.01)

(58) Field of Classification Search
CPC combination set(s) only.
See application file for complete search history.

(56) References Cited

U.S. PATENT DOCUMENTS

| 2012/0249444 | A1 | 10/2012 | Lee et al. | |
|---|---|---|---|---|
| 2013/0293791 | A1 | 11/2013 | Abe | |
| 2014/0192278 | A1* | 7/2014 | Esaka | G06F 3/044 349/12 |
| 2014/0333555 | A1* | 11/2014 | Oh | G06F 3/044 345/173 |
| 2015/0185539 | A1 | 7/2015 | Senokuchi et al. | |
| 2015/0212630 | A1* | 7/2015 | Naito | G06F 3/0412 345/174 |

FOREIGN PATENT DOCUMENTS

| CN | 204557432 | 8/2015 |
|---|---|---|
| JP | 2015-011491 A | 1/2015 |
| JP | 2017-068300 | 4/2017 |

OTHER PUBLICATIONS

Chinese Office Action for corresponding Chinese Application No. 201611010121.X, dated Jun. 21, 2019, (21 pages).

* cited by examiner

*Primary Examiner* — Deeprose Subedi
(74) *Attorney, Agent, or Firm* — K&L Gates LLP

(57) ABSTRACT

A touch detection device includes: a substrate including a display region for displaying an image, a first frame region outside the display region, and a second frame region outside the first frame region; a plurality of detection electrodes that are arranged in the display region on a face parallel with the substrate and include metal wires; and frame wires that are coupled to the detection electrodes and arranged in the first frame region and the second frame region. A ratio of a covering area of the frame wires to a predetermined area of the substrate in the first frame region is smaller than a ratio of the covering area of the frame wires to the predetermined area of the substrate in the second frame region.

13 Claims, 18 Drawing Sheets

DETECTION DEVICE

CROSS-REFERENCE TO RELATED APPLICATIONS

The present application is a continuation application of U.S. patent application Ser. No. 15/281,720, filed on Sep. 30, 2016, which claims priority from Japanese Application No. 2015-228026, filed on Nov. 20, 2015, the contents of which are incorporated by reference herein in its entirety.

BACKGROUND

1. Technical Field

The present invention relates to a touch detection device and a display device with a touch detection function that can detect an external proximity object.

2. Description of the Related Art

In recent years, attention is paid for a touch detection device that can detect an external proximity object, what is called a touch panel. The touch panel is used for a display device with a touch detection function that is mounted on or integrated with a display device such as a liquid crystal display device. The display device with a touch detection function causes the display device to display various button images and the like so that information can be input through the touch panel in place of a normal mechanical button.

Japanese Patent Application Laid-open Publication No. 2015-011491 A discloses an electrostatic capacitance type touch panel. This touch panel includes electrodes arranged in a display region for detecting a touch input, and frame wire that is coupled to the electrode and arranged in a frame region. The frame wire arranged in the frame region is overlapped on a decorative layer of a cover glass to prevent the frame wire from being visually recognized from the outside.

Patent Literature 1: Japanese Laid-open Patent Publication No. 2015-011491 A

However, to narrow the frame of the touch panel, the frame wire arranged in the frame region may be arranged near the display region, and the frame wire may be visually recognized when viewed from an oblique direction in some cases. Thus, the frame wire may be difficult to be arranged near the display region, and the width of the frame region is possibly increased. When the decorative layer is provided to the cover glass as described above, position accuracy of the decorative layer and alignment accuracy of the cover glass need to be considered. Accordingly, an area of the decorative layer needs to be increased, so that the width of the frame region may be increased.

SUMMARY

According to an aspect, a touch detection device includes:

a substrate including a display region for displaying an image, a first frame region outside the display region, and a second frame region outside the first frame region;

a plurality of detection electrodes that are arranged in the display region on a face parallel with the substrate and include metal wires; and a plurality of frame wires that are coupled to the detection electrodes and arranged in the first frame region and the second frame region.

A ratio of a covering area of the frame wires to a predetermined area of the substrate in the first frame region is smaller than a ratio of a covering area of the frame wires to the predetermined area of the substrate in the second frame region.

According to an aspect, a display device with a touch detection function includes:

a plurality of pixel electrodes arranged in a matrix in the display region on the face parallel with the substrate; and a display function layer that exhibits an image display function in the display region.

DETAILED DESCRIPTION

Figure 1:
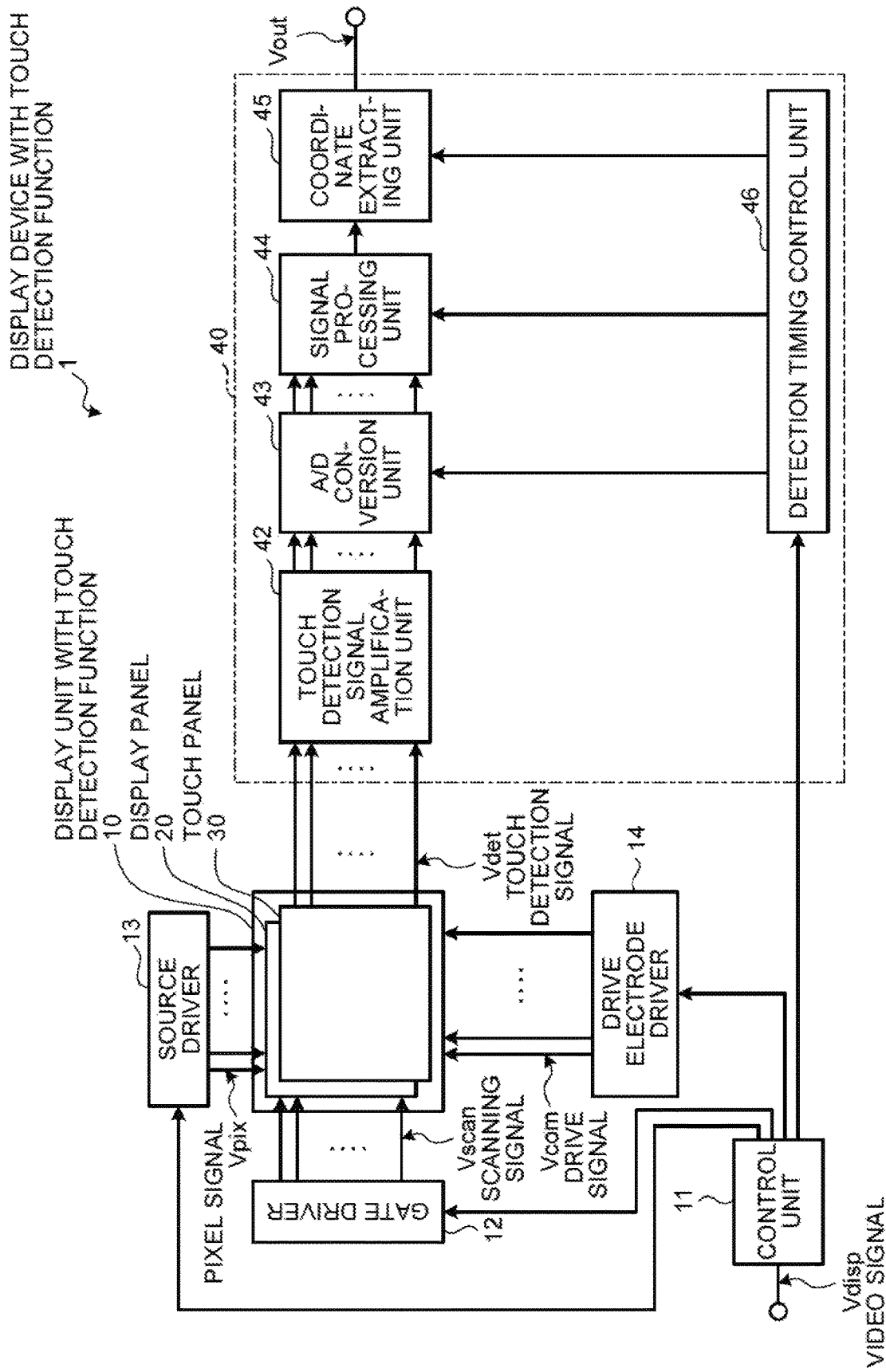
FIG. 1 is a block diagram illustrating a configuration example of a display device with a touch detection function according to a first embodiment.

The following describes embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

First Embodiment

FIG. 1 is a block diagram illustrating a configuration example of a display device with a touch detection function according to a first embodiment. As illustrated in FIG. 1, a display device 1 with a touch detection function includes a display unit 10 with a touch detection function, a control unit 11, a gate driver 12, a source driver 13, a drive electrode driver 14, and a touch detection unit 40. In the display device 1 with a touch detection function, a touch detection function is incorporated in the display unit 10 with a touch detection function. The display unit 10 with a touch detection function is a device integrating a display panel 20 including a liquid crystal display element as a display element with a touch panel 30 serving as a touch detection device for detecting a touch input. The display unit 10 with a touch detection function may be what is called an on-cell device in which the touch panel 30 is mounted on the display panel 20. The display panel 20 may be, for example, an organic EL display panel.

As described later, the display panel 20 is an element that sequentially performs scanning for each horizontal line to perform display in accordance with a scanning signal Vscan supplied from the gate driver 12. The control unit 11 is a circuit that supplies a control signal to each of the gate driver 12, the source driver 13, the drive electrode driver 14, and the touch detection unit 40 based on a video signal Vdisp supplied from the outside to control these components to operate in synchronization with each other.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described later) in the display unit 10 with a touch detection function based on the control signal supplied from the control unit 11.

The drive electrode driver 14 is a circuit that supplies a drive signal Vcom to a drive electrode COML (described later) in the display unit 10 with a touch detection function based on the control signal supplied from the control unit 11.

The touch panel 30 operates based on a basic principle of capacitance touch detection, and performs a touch detection operation using a mutual capacitance method to detect contact or proximity of an external conductor to a display region. The touch panel 30 may perform the touch detection operation using a self capacitance method.

The touch detection unit 40 is a circuit that detects whether there is a touch on the touch panel 30 based on the control signal supplied from the control unit 11 and a touch detection signal Vdet supplied from the touch panel 30. The touch detection unit 40 obtains coordinates at which the touch input is performed when there is a touch. The touch detection unit 40 includes a touch detection signal amplification unit 42, an A/D conversion unit 43, a signal processing unit 44, and a coordinate extracting unit 45. A detection timing control unit 46 controls the A/D conversion unit 43, the signal processing unit 44, and the coordinate extracting unit 45 to operate in synchronization with each other based on the control signal supplied from the control unit 11.

Figure 2:
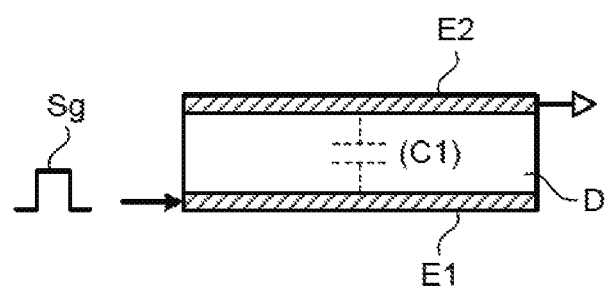
FIG. 2 is an explanatory diagram representing a state in which a finger is in a non-contact state or a non-proximate state for explaining a basic principle of mutual capacitance touch detection.
Figure 3:
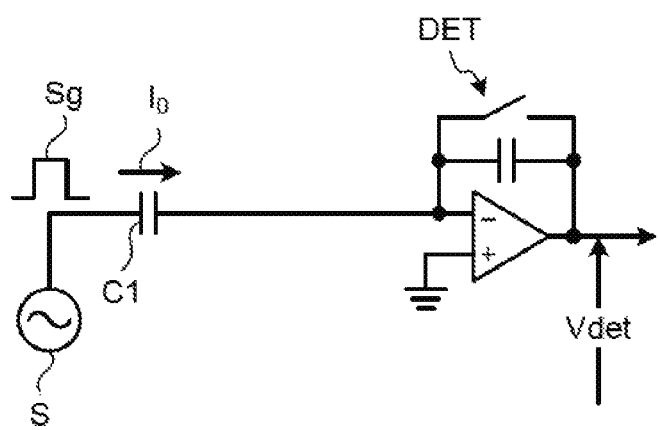
FIG. 3 is an explanatory diagram illustrating an example of an equivalent circuit of the state in which the finger is in the non-contact state or the non-proximate state as illustrated in FIG. 2.
Figure 4:
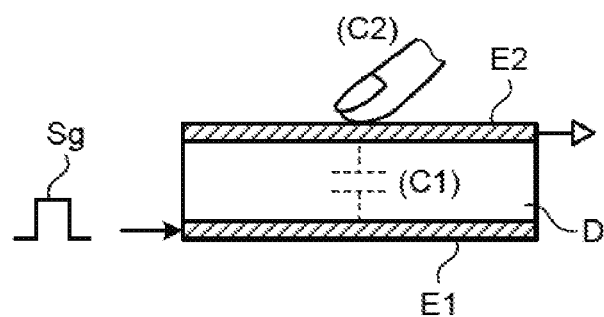
FIG. 4 is an explanatory diagram representing a state in which the finger is in a contact state or a proximate state for explaining the basic principle of mutual capacitance touch detection.
Figure 5:
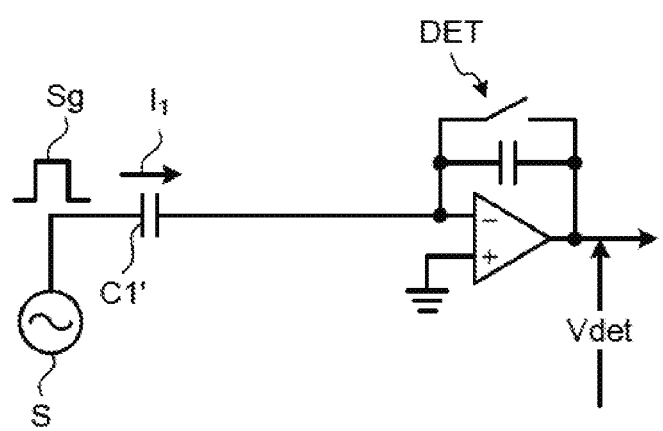
FIG. 5 is an explanatory diagram illustrating an example of an equivalent circuit of the state in which the finger is in the contact state or the proximate state as illustrated in FIG. 4.
Figure 6:
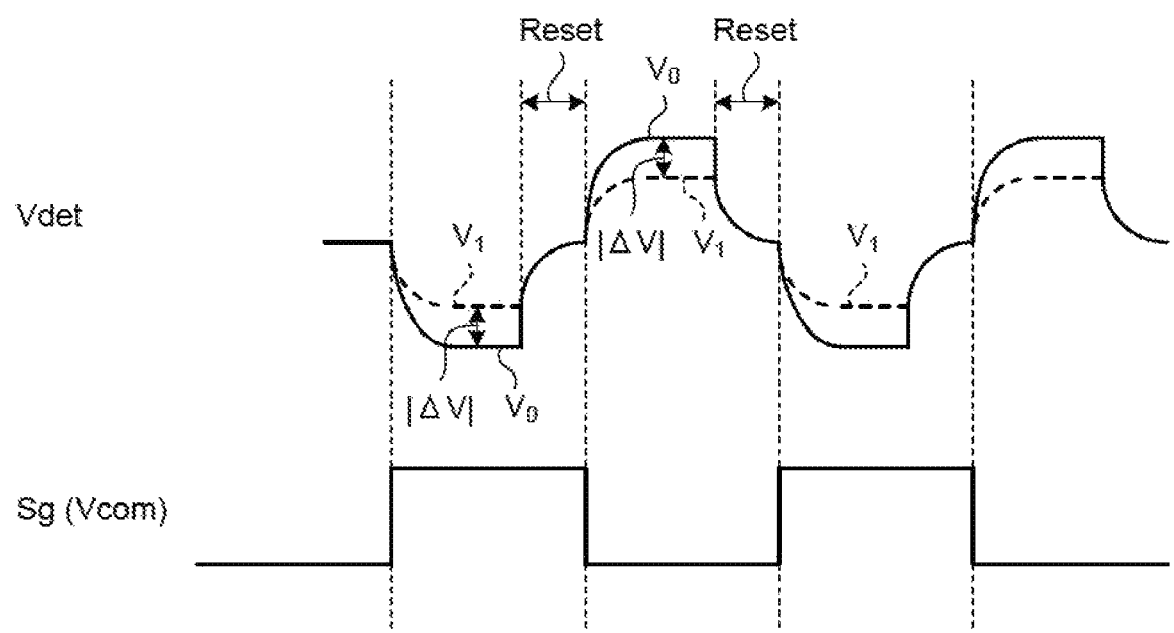
FIG. 6 is a diagram representing an example of waveforms of a drive signal and a touch detection signal for mutual capacitance touch detection.

As described above, the touch panel 30 operates based on the basic principle of capacitance touch detection. With reference to FIGS. 2 to 6, the following describes the basic principle of mutual capacitance touch detection performed by the display device 1 with a touch detection function according to the present embodiment. FIG. 2 is an explanatory diagram representing a state in which a finger is in a non-contact state or a non-proximate state for explaining the basic principle of mutual capacitance touch detection. FIG. 3 is an explanatory diagram illustrating an example of an equivalent circuit of the state in which the finger is in the non-contact state or the non-proximate state as illustrated in FIG. 2. FIG. 4 is an explanatory diagram representing a state in which the finger is in a contact state or a proximate state for explaining the basic principle of mutual capacitance touch detection. FIG. 5 is an explanatory diagram illustrating an example of an equivalent circuit of the state in which the finger is in the contact state or the proximate state as illustrated in FIG. 4. FIG. 6 is a diagram representing an example of waveforms of the drive signal and the touch detection signal. The following describes a case in which a finger is brought into contact with or proximate to the touch panel. Alternatively, for example, an object including a conductor such as a stylus pen may be replaced with the finger.

For example, as illustrated in FIG. 2, a capacitive element C1 includes a pair of electrodes arranged facing each other with a dielectric D interposed therebetween, that is, a drive electrode E1 and a touch detection electrode E2. As illustrated in FIG. 3, one end of the capacitive element C1 is coupled to an AC signal source (driving signal source) S, and the other end thereof is coupled to a voltage detector DET. The voltage detector DET is, for example, an integrating circuit included in the touch detection signal amplification unit 42 illustrated in FIG. 1.

When an AC rectangular wave Sg having a predetermined frequency (for example, about several kiloHertz to several hundreds of kiloHertz) is applied to the drive electrode E1 (one end of the capacitive element C1) from the AC signal source S, an output waveform (touch detection signal Vdet) as illustrated in FIG. 6 appears via the voltage detector DET coupled to the touch detection electrode E2 (the other end of the capacitive element C1). The AC rectangular wave Sg corresponds to the drive signal Vcom input from the drive electrode driver 14.

In a state in which the finger is not in contact with or proximate to the touch panel (non-contact state), as illustrated in FIGS. 2 and 3, a current $I_0$ corresponding to a capacitance value of the capacitive element C1 flows in accordance with charge and discharge of the capacitive element C1. The voltage detector DET illustrated in FIG. 3 converts variation in the current $I_0$ corresponding to the AC rectangular wave Sg into variation in a voltage (a waveform $V_0$ of a solid line (refer to FIG. 6)).

In a state in which the finger is in contact with (or proximate to) the touch panel (contact state), as illustrated in FIG. 4, capacitance C2 formed by the finger is in contact with or proximate to the touch detection electrode E2, so that capacitance corresponding to a fringe between the drive electrode E1 and the touch detection electrode E2 is shielded. Due to this, the capacitive element C1 functions as a capacitive element C1' having a capacitance value smaller than the capacitance value in the non-contact state, as illustrated in FIG. 5. With reference to the equivalent circuit illustrated in FIG. 5, a current $I_1$ flows through the capacitive element C1'. As illustrated in FIG. 6, the voltage detector DET converts variation in the current $I_1$ corresponding to the AC rectangular wave Sg into variation in the voltage (a waveform $V_1$ of a dotted line). In this case, amplitude of the waveform $V_1$ is smaller than that of the waveform $V_0$ described above. Accordingly, an absolute value |ΔV| of a voltage difference between the waveform $V_0$ and the waveform $V_1$ varies depending on influence of a conductor such as a finger that is brought into contact with or proximate to the touch panel from the outside. To accurately detect the absolute value |ΔV| of the voltage difference between the waveform $V_0$ and the waveform $V_1$, it is more preferable to provide, in an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially performs scanning for each detection block in accordance with the drive signal Vcom supplied from the drive electrode driver 14 to perform mutual capacitance touch detection.

The touch panel 30 outputs the touch detection signal Vdet for each detection block from touch detection electrodes TDL (described later) via the voltage detector DET illustrated in FIG. 3 or FIG. 5. The touch detection signal Vdet is supplied to the touch detection signal amplification unit 42 of the touch detection unit 40.

The touch detection signal amplification unit 42 amplifies the touch detection signal Vdet supplied from the touch panel 30. The touch detection signal amplification unit 42 may include an analog low pass filter (LPF) that removes and outputs a high frequency component (noise component) included in the touch detection signal Vdet.

The A/D conversion unit 43 samples each analog signal output from the touch detection signal amplification unit 42 at a timing synchronized with the drive signal Vcom, and converts the analog signal into a digital signal.

The signal processing unit 44 includes a digital filter that reduces a frequency component (noise component) other than a frequency at which the drive signal Vcom is sampled included in the output signal of the A/D conversion unit 43. The signal processing unit 44 is a logic circuit that detects whether there is a touch on the touch panel 30 based on the output signal of the A/D conversion unit 43. The signal processing unit 44 performs processing of extracting only a difference of the detection signal caused by the finger. The signal of the difference caused by the finger has the absolute value |ΔV| of the difference between the waveform $V_0$ and the waveform $V_1$ described above. The signal processing unit 44 may perform an arithmetic operation for averaging the absolute value |ΔV| for each detection block to obtain an average value of the absolute value |ΔV|. Due to this, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in the non-contact state. The signal processing unit 44 compares the detected signal of the difference caused by the finger with a predetermined threshold voltage. If the digital voltage is equal to or larger than the threshold voltage, the signal processing unit 44 determines that an external proximity object is in the contact state. In this way, the touch detection unit 40 can perform touch detection.

The coordinate extracting unit 45 is a logic circuit that obtains, when a touch is detected by the signal processing unit 44, touch panel coordinates at which the touch is detected. The coordinate extracting unit 45 outputs the touch panel coordinates as a detection signal output Vout. As described above, the display device 1 with a touch detection function according to the present embodiment can perform the touch detection operation based on a basic principle of mutual capacitance touch detection.

Figure 7:
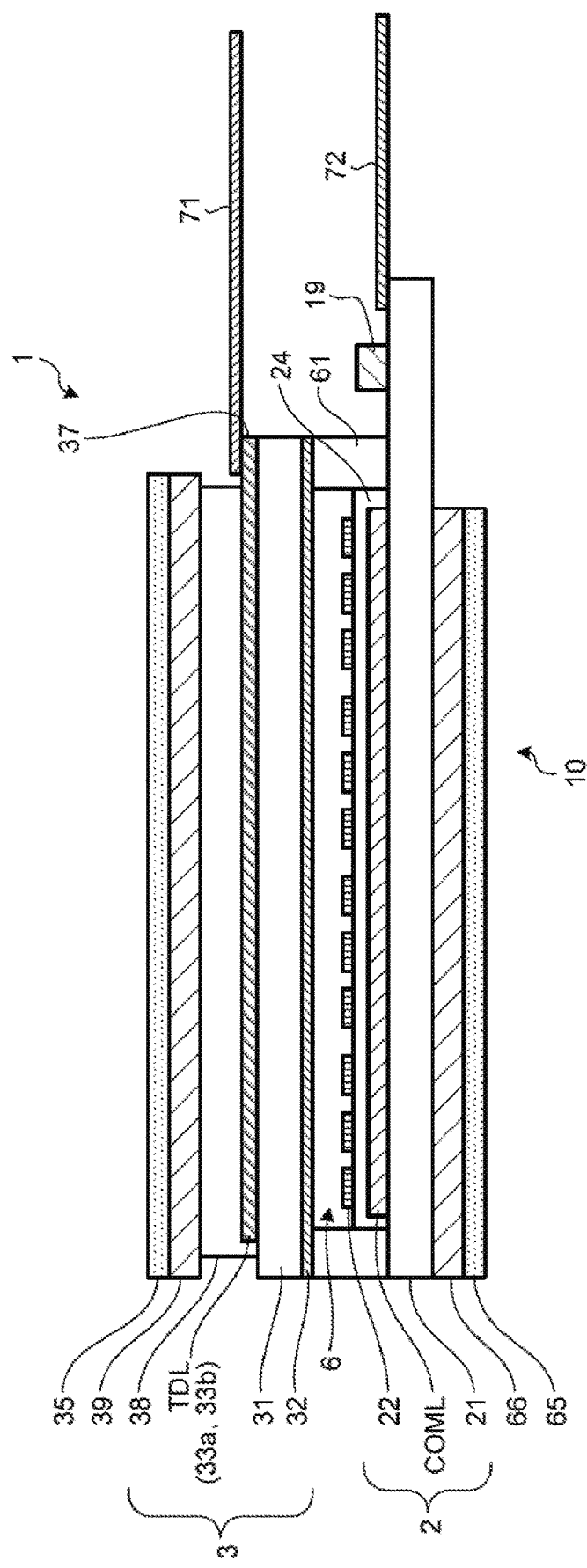
FIG. 7 is a cross-sectional view representing a schematic cross-sectional structure of the display device with a touch detection function.
Figure 8:
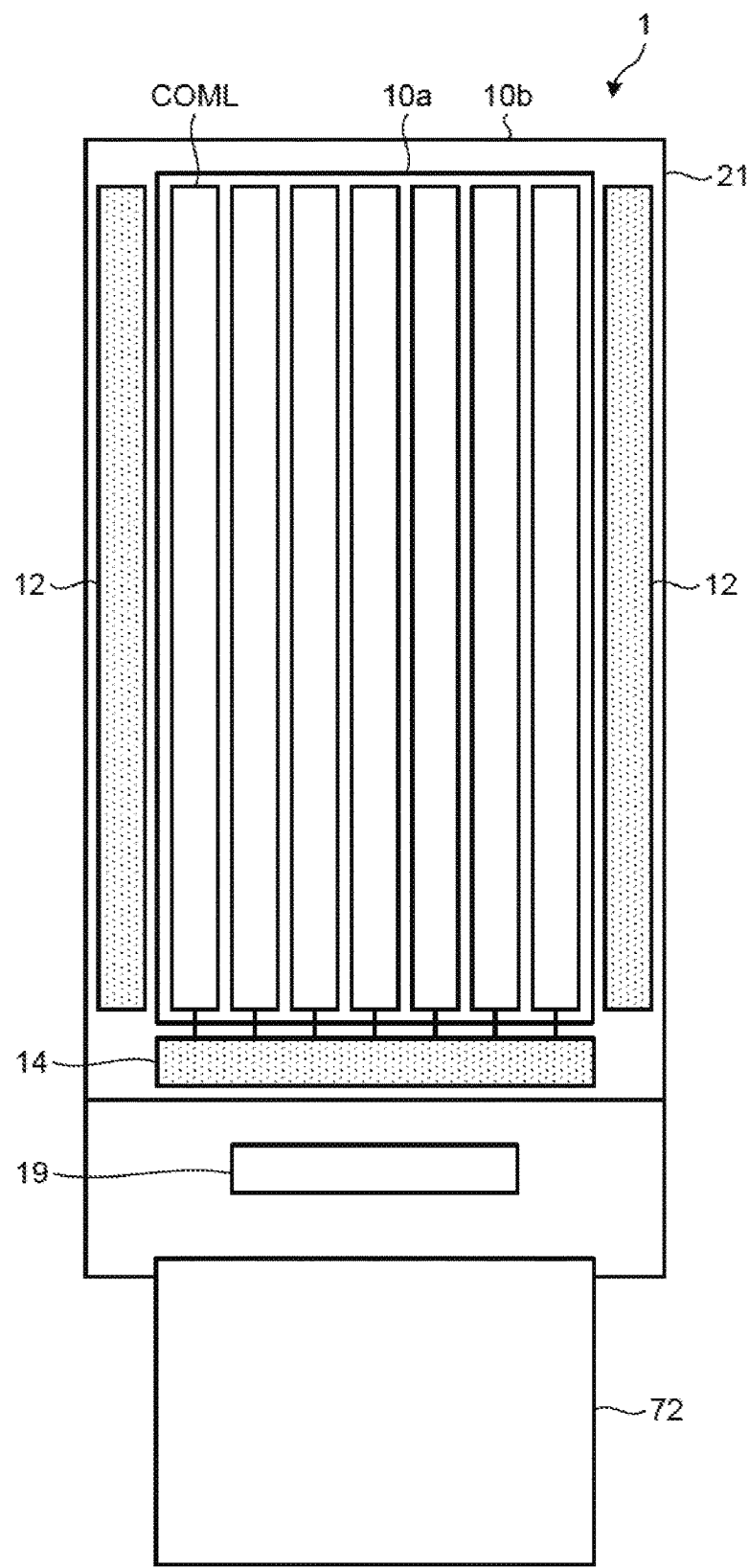
FIG. 8 is a plan view schematically illustrating a TFT substrate constituting the display device with a touch detection function.
Figure 9:
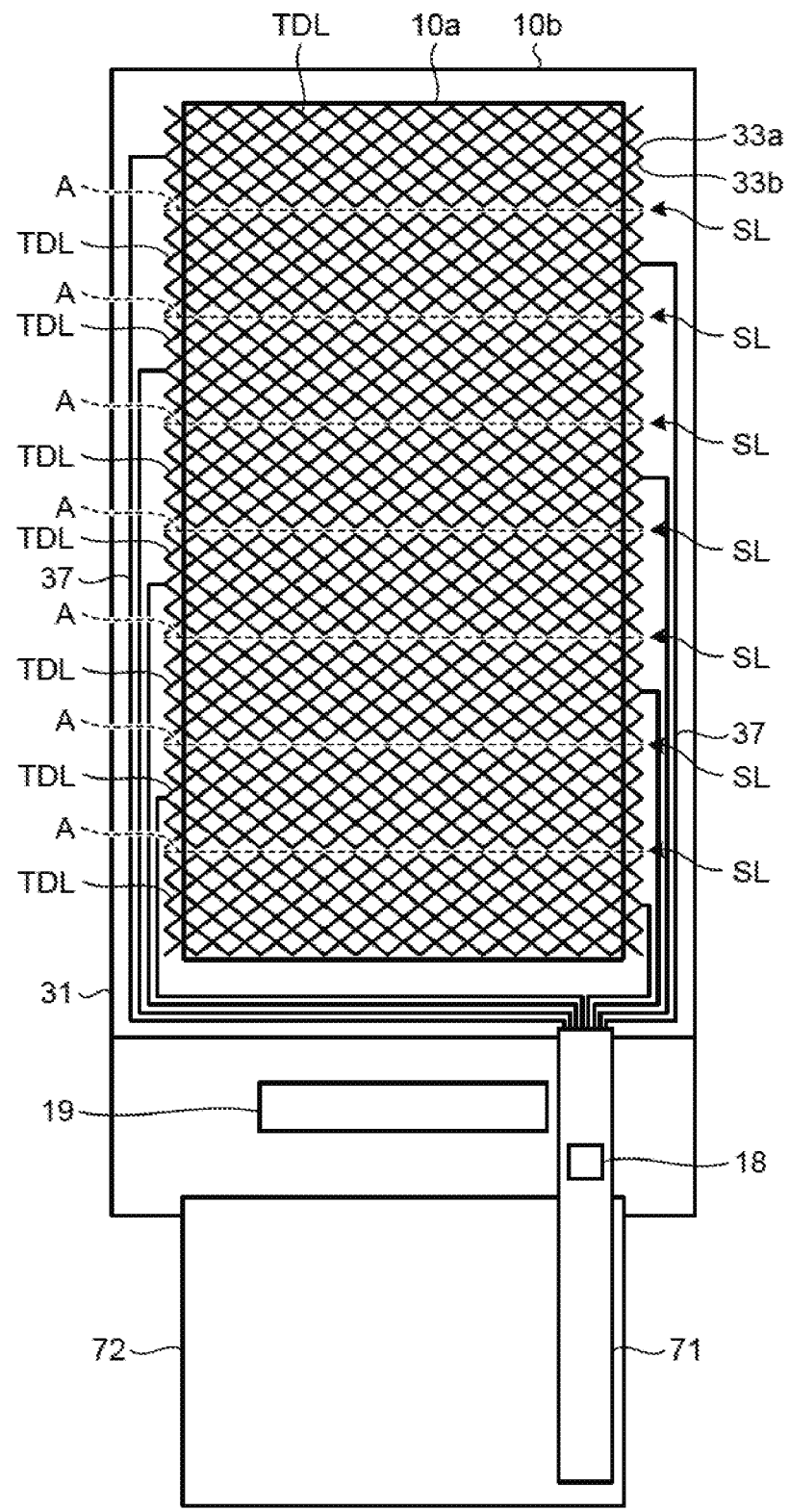
FIG. 9 is a plan view schematically illustrating a glass substrate constituting the display device with a touch detection function.

Next, the following describes a configuration example of the display device 1 with a touch detection function in detail. FIG. 7 is a cross-sectional view representing a schematic cross-sectional structure of the display device with a touch detection function. FIG. 8 is a plan view schematically illustrating a TFT substrate constituting the display device with a touch detection function. FIG. 9 is a plan view schematically illustrating a glass substrate constituting the display device with a touch detection function. As illustrated in FIG. 7, the display unit 10 with a touch detection function includes a pixel substrate 2, a counter substrate 3 arranged facing the pixel substrate 2 in a direction perpendicular to a surface of the pixel substrate 2, and a liquid crystal layer 6 interposed between the pixel substrate 2 and the counter substrate 3.

As illustrated in FIG. 7, the pixel substrate 2 includes a thin film transistor (TFT) substrate 21 serving as a circuit board, a plurality of pixel electrodes 22 arranged in a matrix above the TFT substrate 21, a plurality of drive electrodes COML arranged between the TFT substrate 21 and the pixel electrode 22, and an insulating layer 24 that insulates the pixel electrode 22 from the drive electrode COML. A polarizing plate 65 may be arranged below the TFT substrate 21 via a bonding layer 66.

A display control IC 19 is arranged on the TFT substrate 21. The display control IC 19 is a chip mounted on the TFT substrate 21 using a chip on glass (COG) system, and incorporates the control unit 11 described above. A flexible substrate 72 is coupled to an end of the TFT substrate 21. The display control IC 19 outputs a control signal to a scanning signal line GCL, a pixel signal line SGL (described later), and the like based on a video signal Vdisp (refer to FIG. 1) supplied from an external host IC (not illustrated).

As illustrated in FIG. 8, the TFT substrate 21 includes a display region 10a for displaying an image, and a frame region 10b outside the display region 10a. The display region 10a has a rectangular shape having a long side and a short side. The frame region 10b has a frame shape surrounding four sides of the display region 10a.

The drive electrodes COML are arranged in the display region 10a of the TFT substrate 21, and extend in a direction along the long side of the display region 10a. The drive electrodes COML are arranged in a direction along the short side of the display region 10a. As the drive electrode COML, for example, used is a translucent conductive material such as indium tin oxide (ITO).

The drive electrode driver 14 and the display control IC 19 are arranged along the short side of the frame region 10b of the TFT substrate 21, and the gate driver 12 is arranged along the long side of the frame region 10b. The flexible substrate 72 is coupled to the short side of the frame region 10b. The drive electrode driver 14 and the flexible substrate 72 are arranged near an end in an extending direction of the drive electrode COML. Thus, the area of the frame region 10b can be reduced by shortening the length of the wire coupled to the drive electrode COML.

As illustrated in FIG. 7, the counter substrate 3 includes a glass substrate 31 and a color filter 32 formed on one face of the glass substrate 31. The touch detection electrode TDL serving as a detection electrode of the touch panel 30 is arranged on the other face of the glass substrate 31. A protective layer 38 is arranged on the touch detection electrode TDL. A polarizing plate 35 is arranged above the touch detection electrode TDL via a bonding layer 39. A flexible substrate 71 is coupled to the glass substrate 31. The flexible substrate 71 is coupled to the touch detection electrode TDL via frame wire 37.

As illustrated in FIG. 9, touch detection electrodes TDL are arranged in the display region 10a of the glass substrate 31. The touch detection electrodes TDL extend in a direction along the short side of the display region 10a, and arranged in a direction along the long side of the display region 10a. Each of the touch detection electrodes TDL includes metal wires 33a and 33b. The metal wires 33a and 33b are formed like a zigzag line or a wavy line with a plurality of bending parts, and extend in a direction along the short side of the display region 10a. The metal wire 33a and the metal wire 33b are arranged in a direction along the long side of the display region 10a. According to the present embodiment, the bending part of the metal wire 33a is coupled to the bending part of the metal wire 33b, and the touch detection electrode TDL is configured to be mesh-like metal wire. The metal wire 33a and the metal wire 33b are separated from each other by a slit SL arranged at a position indicated by the dotted line A in FIG. 9. Each group of the metal wire 33a and the metal wire 33b separated by the slit SL functions as one touch detection electrode TDL.

The metal wires 33a and 33b are formed of at least one of metal materials including aluminum (Al), copper (Cu), silver (Ag), molybdenum (Mo), and alloy thereof. The metal wires 33a and 33b may be a laminate obtained by using one or more of the metal materials to be laminated. At least one of the metal materials including aluminum (Al), copper (Cu), silver (Ag), and alloy thereof has resistance lower than that of translucent conductive oxide such as ITO as a material of a transparent electrode. At least one of the metal materials including aluminum (Al), copper (Cu), silver (Ag), and alloy thereof has a light shielding property as compared to the translucent conductive oxide such as ITO, so that a transmittance may be lowered or a pattern of the touch detection electrode TDL may be visually recognized. According to the present embodiment, one touch detection electrode TDL includes metal wires 33a and 33b having a narrow width, and the metal wires 33a and 33b are arranged like a mesh at intervals larger than a wire width, so that lower resistance and invisibility can be achieved. As a result, resistance of the touch detection electrode TDL is reduced, so that a thickness of the display device 1 with a touch detection function can be reduced, a screen size thereof can be increased, or higher definition can be achieved.

The width of each of metal wires 33a and 33b is preferably in a range from 2 μm to 10 μm inclusive. This is because, when the width of each of metal wires 33a and 33b is equal to or smaller than 10 μm, an area of the display region 10a covering an opening is reduced, the opening being a region in which light transmission is not suppressed by a black matrix or the scanning signal line GCL and the pixel signal line SGL, so that a possibility of deteriorating an aperture ratio is reduced. Additionally, when the width of each of metal wires 33a and 33b is equal to or larger than 2 μm, the shape is stabilized, and a possibility of disconnection is reduced.

As illustrated in FIG. 9, frame wires 37 coupled to the touch detection electrode TDL are arranged in the frame region 10b of the glass substrate 31. The flexible substrate 71 is coupled to the short side of the frame region 10b of the glass substrate 31. The frame wire 37 extends along the long side of the frame region 10b, and is coupled to the flexible substrate 71. A touch detection IC 18 is mounted on the flexible substrate 71. The touch detection unit 40 illustrated in FIG. 1 is mounted on the touch detection IC 18, and the touch detection signal Vdet output from the touch detection electrode TDL is supplied to the touch detection IC 18 via the frame wire 37 and the flexible substrate 71.

As illustrated in FIG. 7, the TFT substrate 21 and the glass substrate 31 are arranged facing each other with a predetermined gap therebetween via a spacer 61. The liquid crystal layer 6 is arranged in a space between the TFT substrate 21 and the glass substrate 31. The liquid crystal layer 6 modulates light passing therethrough depending on a state of an electric field. For example, liquid crystals of lateral electric-field mode such as in-plane switching (IPS) including fringe field switching (FFS) is used. An orientation film may be arranged between the liquid crystal layer 6 and the pixel substrate 2, and between the liquid crystal layer 6 and the counter substrate 3 illustrated in FIG. 7.

Figure 10:
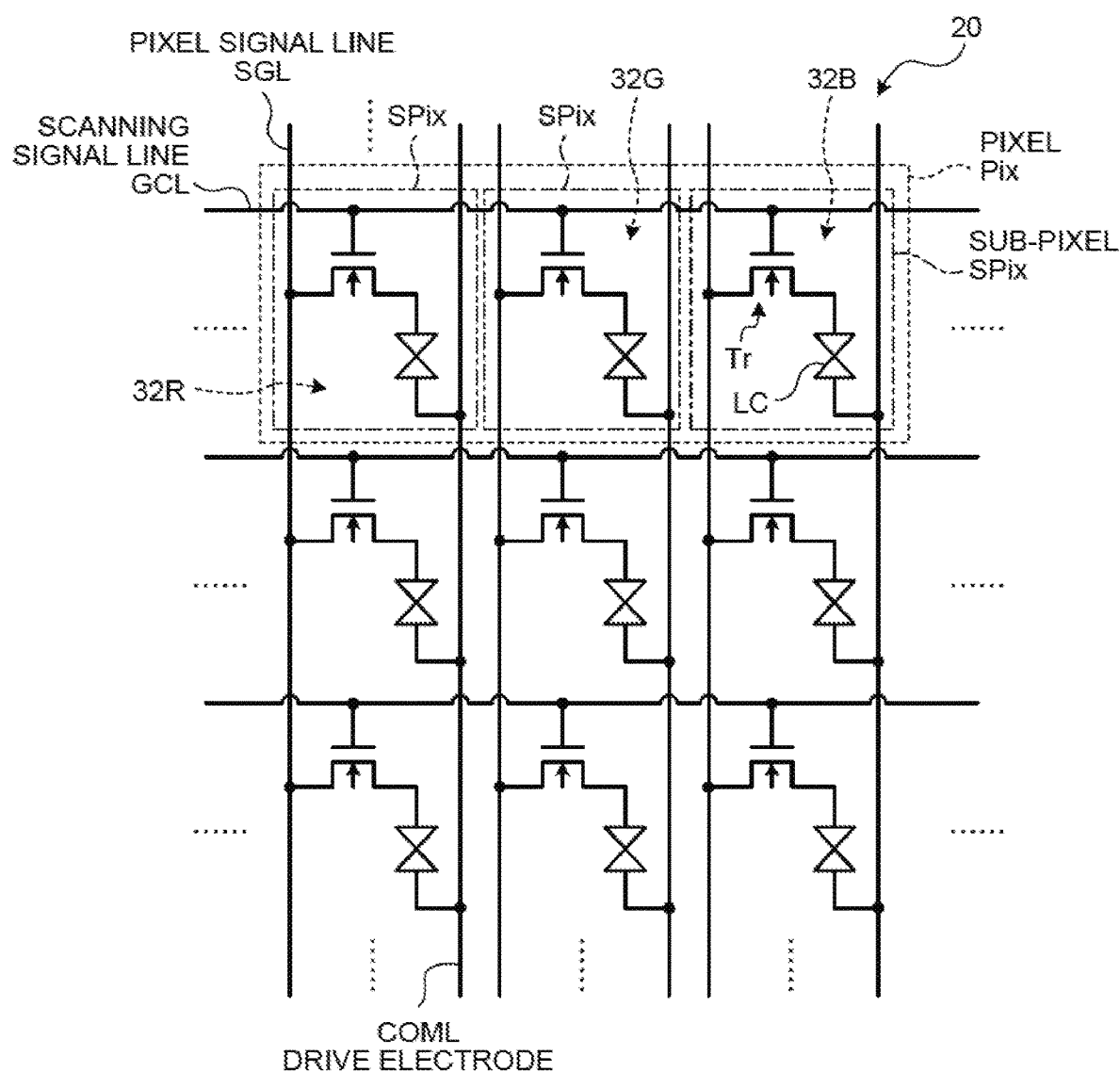
FIG. 10 is a circuit diagram representing a pixel array of a display unit with a touch detection function according to the first embodiment.

Next, the following describes a display operation of the display panel 20. FIG. 10 is a circuit diagram representing a pixel array of a display unit with a touch detection function according to the first embodiment. In the TFT substrate 21, formed are a thin film transistor element (hereinafter, referred to as a TFT element) Tr of each sub-pixel SPix illustrated in FIG. 10, and wire such as the pixel signal line SGL that supplies the pixel signal Vpix to each pixel electrode 22 and the scanning signal line GCL that supplies a drive signal for driving each TFT element Tr. The pixel signal line SGL and the scanning signal line GCL extend along a plane parallel with the surface of the TFT substrate 21.

The display panel 20 illustrated in FIG. 10 includes a plurality of sub-pixels SPix arranged in a matrix. Each sub-pixel SPix includes the TFT element Tr and a liquid crystal element LC. The TFT element Tr is constituted of a thin film transistor. In this example, the TFT element Tr is constituted of an n-channel metal oxide semiconductor (MOS) TFT. A source of the TFT element Tr is coupled to the pixel signal line SGL, a gate thereof is coupled to the scanning signal line GCL, and a drain thereof is coupled to one end of the liquid crystal element LC. One end of the liquid crystal element LC is coupled to the drain of the TFT element Tr, and the other end thereof is coupled to the drive electrode COML.

The sub-pixel SPix is coupled to the other sub-pixel SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixel SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixel SPix belonging to the same column via the drive electrode COML. The drive electrode COML is coupled to the drive electrode driver 14 (refer to FIG. 1), and receives the drive signal Vcom supplied from the drive electrode driver 14. That is, in this example, a plurality of sub-pixels SPix belonging to the same row share one drive electrode COML.

The gate driver 12 illustrated in FIG. 1 drives the scanning signal line GCL to sequentially perform scanning. The gate driver 12 applies the scanning signal Vscan (refer to FIG. 1) to a gate of the TFT element Tr of the sub-pixel SPix via the scanning signal line GCL to sequentially select one line (one horizontal line) of the sub-pixels SPix as the display driving target. In the display device 1 with a touch detection function for the sub-pixels SPix belonging to one horizontal line, the source driver 13 supplies the pixel signal Vpix to the sub-pixels SPix constituting the selected one horizontal line via the pixel signal line SGL illustrated in FIG. 10. The sub-pixels SPix perform display for each horizontal line in accordance with the pixel signal Vpix to be supplied. In performing this display operation, the drive electrode driver 14 applies the drive signal Vcom to the drive electrode COML. A common potential is supplied to the pixel electrode 22 by the drive signal Vcom in the display operation.

In the color filter 32 illustrated in FIG. 7, for example, color regions of the color filter colored in three colors of red (R), green (G), and blue (B) may be periodically arranged. Color regions 32R, 32G, and 32B of three colors R, G, and B are associated, as one set, with each of the sub-pixels SPix illustrated in FIG. 10, and a pixel Pix is constituted of a set of sub-pixels SPix corresponding to the color regions 32R, 32G, and 32B of three colors. As illustrated in FIG. 7, the color filter 32 faces the liquid crystal layer 6 in a direction perpendicular to the TFT substrate 21. Another combination of colors may be used for the color filter 32 so long as the colors are different from each other. The combination of colors for the color filter 32 is not limited to three colors. Alternatively, four or more colors may be combined.

As illustrated in FIG. 10, according to the present embodiment, the drive electrode COML extends in a direction parallel with an extending direction of the pixel signal line SGL, and extends in a direction intersecting with an extending direction of the scanning signal line GCL. Thus, the wire from the drive electrode COML can be coupled to the short side (flexible substrate 72 side) of the frame region 10b (refer to FIG. 8). Accordingly, as compared with a case in which the drive electrode COML is arranged in a direction orthogonal to the pixel signal line SGL, the drive electrode driver 14 is not required to be arranged on the long side of the frame region 10b, so that the width of the frame region 10b can be reduced. The extending direction of the drive electrode COML is not limited thereto. For example, the drive electrode COML may extend in a direction parallel with the scanning signal line GCL.

Figure 11:
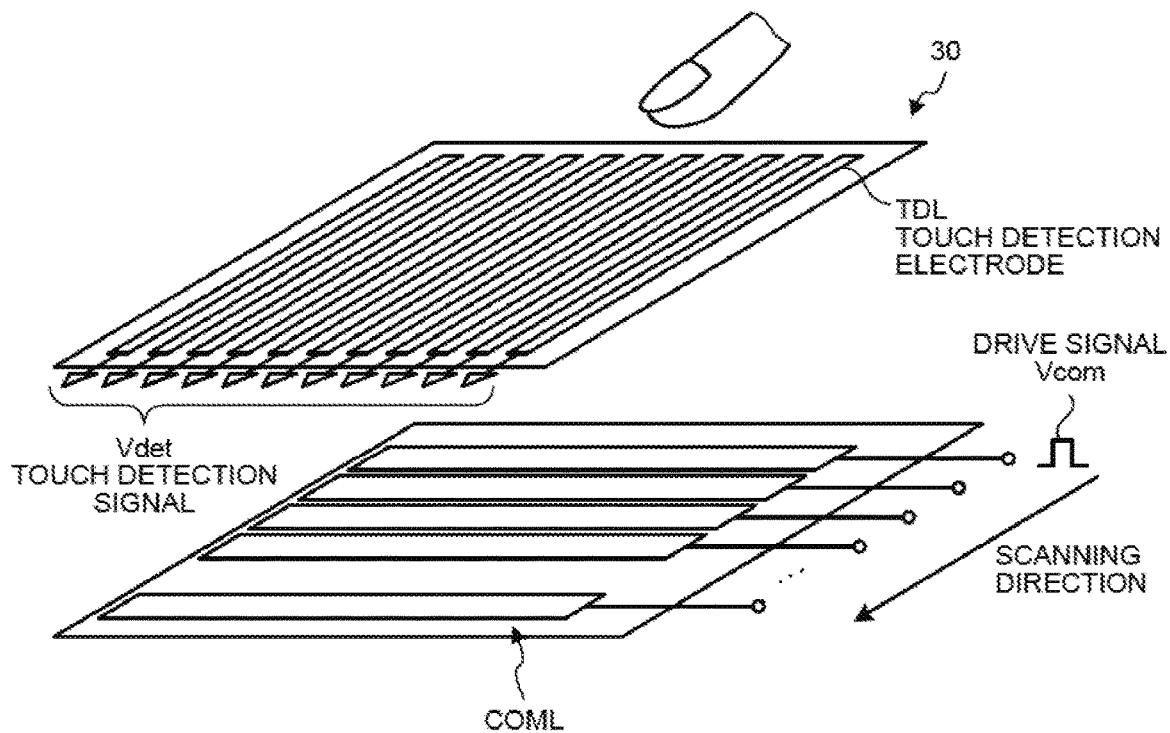
FIG. 11 is a perspective view representing a configuration example of a drive electrode and a touch detection electrode of the display unit with a touch detection function according to the first embodiment.

The drive electrode COML illustrated in FIG. 7 and FIG. 8 functions as a common electrode that gives a common potential to the pixel electrodes 22 of the display panel 20, and also functions as a drive electrode for performing mutual capacitance touch detection of the touch panel 30. The drive electrode COML may also function as a detection electrode for performing self capacitance touch detection of the touch panel 30. FIG. 11 is a perspective view representing a configuration example of the drive electrode and the touch detection electrode of the display unit with a touch detection function according to the first embodiment. The touch panel 30 is constituted of the drive electrode COML arranged in the pixel substrate 2 and the touch detection electrode TDL arranged in the counter substrate 3.

The drive electrode COML includes a plurality of stripe electrode patterns extending in a horizontal direction of FIG. 11. The touch detection electrode TDL includes a plurality of electrode patterns extending in a direction intersecting with the extending direction of the electrode patterns of the drive electrode COML. The touch detection electrode TDL faces the drive electrode COML in a direction perpendicular to the surface of the TFT substrate 21 (refer to FIG. 7). Each electrode pattern of the touch detection electrode TDL is coupled to an input of the touch detection signal amplification unit 42 in the touch detection unit 40 (refer to FIG. 1). Capacitance is formed at each intersecting portion between each electrode pattern of the drive electrode COML and each electrode pattern of the touch detection electrode TDL.

The shapes of the touch detection electrode TDL and the drive electrode COML (drive electrode block) are not limited to a plurality of stripes. For example, the touch detection electrode TDL and the drive electrode COML may have a comb-teeth shape or the like. Alternatively, it is sufficient that the touch detection electrode TDL and the drive electrode COML are divided into a plurality of parts, and a slit that divides the drive electrode COML may have a linear shape or a curved shape.

With this configuration, when the touch panel 30 performs a mutual capacitance touch detection operation, the drive electrode driver 14 drives the drive electrode COML to sequentially perform scanning in a time division manner as a drive electrode block, so that one detection block of the drive electrode COML is sequentially selected. When the touch detection signal Vdet is output from the touch detection electrode TDL, touch detection for one detection block is performed. That is, the drive electrode block corresponds to the drive electrode E1 in the basic principle of mutual capacitance touch detection described above, the touch detection electrode TDL corresponds to the touch detection electrode E2, and the touch panel 30 detects a touch input in accordance with the basic principle. As illustrated in FIG. 11, in the touch panel 30, the touch detection electrode TDL and the drive electrode COML intersecting with each other constitute a capacitance touch sensor in a matrix. Thus, by scanning across the entire touch detection surface of the touch panel 30, a position where an external conductor is brought into contact with or proximate to the touch panel 30 can be detected.

As an example of an operation method of the display device 1 with a touch detection function, the display device 1 with a touch detection function performs a touch detection operation (touch detection period) and a display operation (display operation period) in a time division manner. The touch detection operation and the display operation may be performed separately in any manner. Hereinafter, the following describes a method of performing the touch detection operation and the display operation being separated into a plurality of operations within one frame period (1F period) of the display panel 20, that is, a time period required for displaying video information for one screen.

Figure 12:
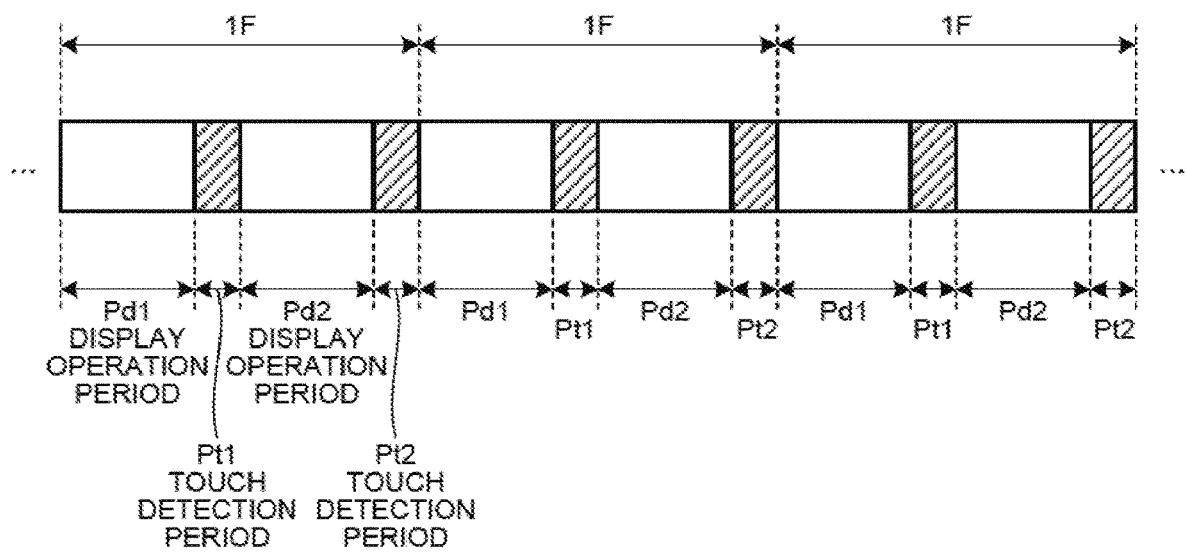
FIG. 12 is a schematic diagram representing an example of an arrangement of a display operation period and a touch detection period in one frame period.

FIG. 12 is a schematic diagram representing an example of an arrangement of the display operation period and the touch detection period in one frame period. One frame period (1F) includes two display operation periods Pd1 and Pd2, and two touch detection periods Pt1 and Pt2. These periods are alternately arranged along a time axis in the following order: the display operation period Pd1, the touch detection period Pt1, the display operation period Pd2, and the touch detection period Pt2.

The control unit 11 (refer to FIG. 1) supplies the pixel signal Vpix to a plurality of rows of pixels Pix (refer to FIG. 10) selected in the respective display operation periods Pd1 and Pd2 via the gate driver 12 and the source driver 13.

The control unit 11 (refer to FIG. 1) supplies the drive signal Vcom for touch detection to the drive electrode COML (refer to FIG. 11) selected in the respective touch detection periods Pt1 and Pt2 via the drive electrode driver 14. The touch detection unit 40 detects whether there is a touch input and performs an arithmetic operation of coordinates of an input position based on the touch detection signal Vdet supplied from the touch detection electrode TDL.

The drive electrode COML also serves as the common electrode of the display panel 20 according to the present embodiment, so that the control unit 11 supplies the drive signal Vcom having a common electrode potential for display to the drive electrode COML selected via the drive electrode driver 14 in the display operation periods Pd1 and Pd2.

When the touch detection operation is performed only with the touch detection electrode TDL without using the drive electrode COML, for example, when touch detection is performed based on a principle of self-capacitance touch detection, the drive electrode driver 14 may supply the drive signal Vcom for touch detection to the touch detection electrode TDL.

In FIG. 12, video display for one screen is separated into two parts in one frame period (1F). Alternatively, the display operation period in one frame period (1F) may be separated into a larger number of parts. The touch detection period may also be separated into a larger number of parts in one frame period (1F).

Touch detection for a half of the screen may be performed in each of the touch detection periods Pt1 and Pt2, or touch detection for one screen may be performed in each of the touch detection periods Pt1 and Pt2. Thinning-out detection and the like may be performed as needed. Alternatively, each of the display operation and the touch detection operation may be performed once in one frame period (1F) without being separated into a plurality of parts.

In the touch detection periods Pt1 and Pt2, the scanning signal line GCL and the pixel signal line SGL (refer to FIG. 10) may be in a floating state in which a voltage signal is not supplied thereto and the electric potential thereof is not fixed. Signals having the same waveform, which are synchronized with the drive signal Vcom, may be supplied to the scanning signal line GCL and the pixel signal line SGL.

Figure 13:
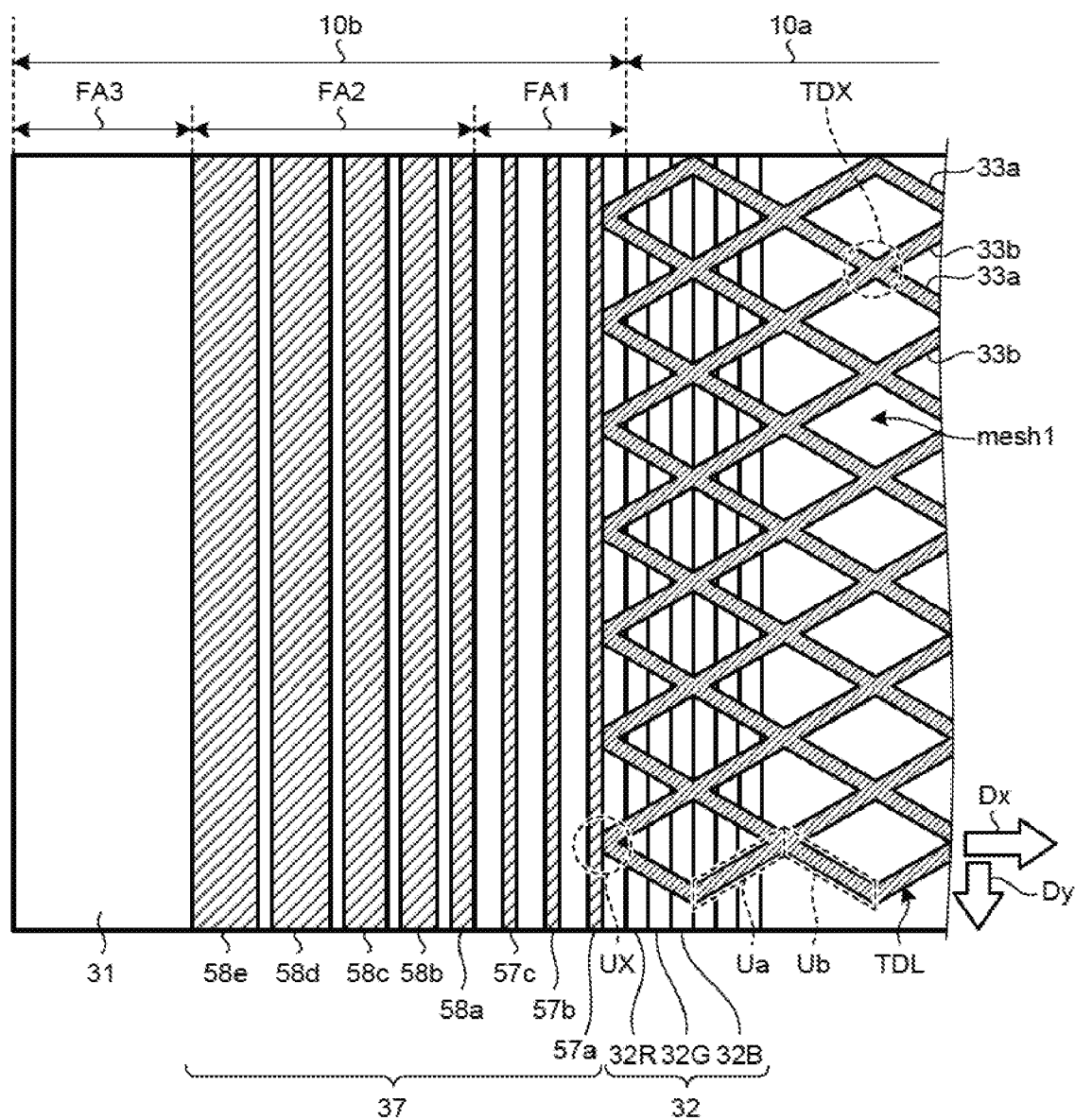
FIG. 13 is a schematic plan view illustrating the touch detection electrode and frame wire in a partially enlarged manner.
Figure 14:
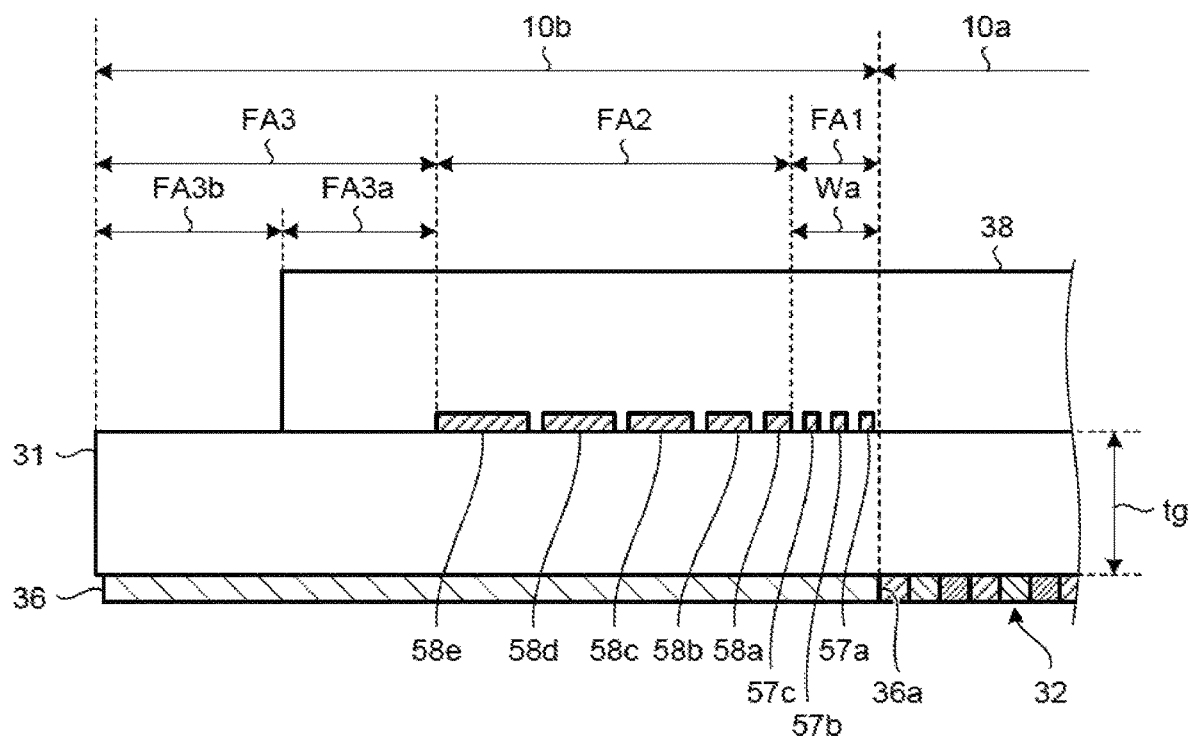
FIG. 14 is a schematic cross-sectional view for explaining a relation between a display region and a frame region.

Next, the following describes a specific configuration of the touch detection electrode TDL and the frame wire 37 according to the present embodiment. FIG. 13 is a schematic plan view illustrating the touch detection electrode and the frame wire in a partially enlarged manner. FIG. 14 is a schematic cross-sectional view for explaining a relation between the display region and the frame region.

As illustrated in FIG. 13, the glass substrate 31 includes the display region 10a for displaying an image and the frame region 10b outside the display region 10a. As illustrated in FIGS. 13 and 14, the frame region 10b is in contact with an outer circumference of the display region 10a, and indicates a region from the outer circumference of the display region 10a to an outer circumference of the glass substrate 31. The frame wire 37 includes first frame wires 57a to 57c and second frame wires 58a to 58e. The touch detection electrode TDL is arranged in the display region 10a, and the first frame wires 57a to 57c and the second frame wires 58a to 58e are arranged in the frame region 10b. The first frame wires 57a to 57c and the second frame wires 58a to 58e extend in parallel with each other in a direction along one side of the frame region 10b. As illustrated in FIG. 14, a light shielding layer 36 is arranged on a lower surface of the glass substrate 31 at a position being overlapped on the frame region 10b. The light shielding layer 36 is colored in black and the like, which suppresses light transmission, and arranged to prevent the first frame wires 57a to 57c and the second frame wires 58a to 58e from being visually recognized from the outside. In the present disclosure, the display region 10a is an inner region as compared with an end 36a on an inner peripheral side of the light shielding layer 36, and indicates a region being overlapped on the color filter 32.

As illustrated in FIG. 13, the touch detection electrode TDL includes the metal wires 33a and 33b. Each of metal wires 33a and 33b includes a thin wire piece Ua and a thin wire piece Ub that are inclined with respect to a direction along the short side of the display region 10a (first direction Dx illustrated in FIG. 13). The thin wire piece Ua and the thin wire piece Ub are inclined in mutually reverse directions. The thin wire piece Ua and the thin wire piece Ub are repeatedly and alternately arranged in the first direction Dx, and bent at a bending part to be coupled to each other. In this way, the metal wires 33a and 33b are formed to be a zigzag line or a wavy line having the bending part. Each of the thin wire piece Ua and the thin wire piece Ub has a straight line. However, the embodiment is not limited thereto. Each of the thin wire piece Ua and the thin wire piece Ub may have a curved line. The thin wire piece Ua and the thin wire piece Ub are inclined in mutually reverse directions at a certain angle with respect to a direction parallel with the extending direction of the color regions 32R, 32G, and 32B of the color filter 32. Accordingly, the thin wire piece Ua and the thin wire piece Ub sequentially shield the color regions 32R, 32G, and 32B, which can prevent the transmittance from being lowered in a specific color region of the color filter 32.

The metal wire 33a and the metal wire 33b have line symmetry with a straight line parallel with the short side of the display region 10a as a symmetric axis. The metal wire 33a and the metal wire 33b are alternately arranged in a direction along the long side of the display region 10a (second direction Dy illustrated in FIG. 13). In the metal wire 33a and the metal wire 33b arranged in the second direction Dy, bending parts are coupled to each other to form an intersecting part TDX. The metal wire 33a and the metal wire 33b are conducted with each other at the intersecting part TDX. With such a configuration, the metal wire 33a and the metal wire 33b form a surrounded region mesh1 surrounded by the thin wire piece Ua and the thin wire piece Ub, and the mesh-like metal wire is provided in the display region 10a.

The frame region 10b includes a first frame region FA1, a second frame region FA2, and a third frame region FA3. The first frame region FA1 is a frame-like region being in contact with the display region 10a and having a width Wa illustrated in FIG. 14 from the outer circumference of the display region 10a. The outer circumference of the display region 10a is at a position overlapping with the end 36a of the light shielding layer 36. The width Wa of the first frame region FA1 is equal to or larger than half the thickness tg of the glass substrate 31. Even when the light shielding layer 36 is provided, the first frame region FA1 is overlapped on the color filter 32, and may be visually recognized from the outside when viewed from an oblique direction.

The first frame wires 57a to 57c are arranged in the first frame region FA1. The first frame wires 57a to 57c extend along the second direction Dy, and are arranged in parallel with each other at intervals in the first direction Dx. The metal wires 33a and 33b extend from the display region 10a to the first frame region FA1, and the first frame wire 57a and the metal wires 33a and 33b are coupled to each other at a coupling part UX. The first frame wires 57b and 57c are coupled to different touch detection electrodes TDL (not illustrated).

The second frame region FA2 is a frame-like region arranged outside the first frame region FA1 while being in contact with the first frame region FA1. The second frame region FA2 has a width larger than that of the first frame region FA1. The second frame wires 58a to 58e are arranged in the second frame region FA2. The second frame wires 58a to 58e extend in parallel with the first frame wires 57a to 57c along the second direction Dy, and are arranged in the first direction Dx. The second frame wires 58a to 58e are coupled to different touch detection electrodes TDL (not illustrated).

The third frame region FA3 is a region from an outer circumference of the second frame region FA2 to the outer circumference of the glass substrate 31 being in contact with the second frame region FA2. The third frame region FA3 is an outer region than the second frame wire 58e in which the first frame wires 57a to 57c and the second frame wires 58a to 58e are not arranged. As illustrated in FIG. 14, the third frame region FA3 includes a region FA3a to which the protective layer 38 is applied, and a region FA3b to which the protective layer 38 is not applied where an upper surface of the glass substrate 31 is exposed from the protective layer 38. The region FA3a is a region obtained by expanding an application region of the protective layer 38 to the outside of the second frame wire 58e so that the first frame wires 57a to 57c and the second frame wires 58a to 58e are securely covered with the protective layer 38. The region FA3b to which the protective layer 38 is not applied is a region generated in a manufacturing process. Alternatively, the protective layer 38 may be arranged to the outer circumference of the glass substrate 31 without providing the region FA3b.

According to the present embodiment, the same metal material as those of the metal wires 33a and 33b is used for the first frame wires 57a to 57c and the second frame wires 58a to 58e. Wiring density of the first frame wires 57a to 57c at least at one side of the first frame region FA1 is larger than the wiring density of the metal wires 33a and 33b in the display region 10a. The wiring density of the second frame wires 58a to 58e in the second frame region FA2 is larger than the wiring density of the first frame wires 57a to 57c in the first frame region FA1.

The wiring density of the metal wires 33a and 33b indicates an occupying ratio of a covering area of the metal wires 33a and 33b to the area of the display region 10a of the glass substrate 31 in a plan view. The wiring density of the first frame wires 57a to 57c indicates an occupying ratio of a covering area of the first frame wires 57a to 57c to the area of the first frame region FA1 of the glass substrate 31 in a plan view. The wiring density of the second frame wires 58a to 58e indicates an occupying ratio of a covering area of the second frame wires 58a to 58e to the area of the second frame region FA2 of the glass substrate 31 in a plan view. Assuming that a diamond shape or a rectangular shape including the four thin wire pieces Ua and thin wire pieces Ub forming the surrounded region mesh1 is a unit area of the glass substrate 31, for example, each value of wiring density may be, for example, an occupying ratio of an area of each of wire to the unit area.

For example, when the width of each of first frame wires 57a to 57c is caused to be the same as that of each of metal wires 33a and 33b, and an interval between the first frame wires 57a to 57c is caused to be smaller than the interval between adjacent intersecting parts TDX, the wiring density in the first frame region FA1 can be caused to be larger than the wiring density in the display region 10a. The width of each of first frame wires 57a to 57c may be caused to be different from that of each of metal wires 33a and 33b. When the width of each of first frame wires 57a to 57c is caused to be larger than that of each of metal wires 33a and 33b, the wiring density can be increased.

The width of each of first frame wires 57a to 57c is preferably in a range from 2 μm to 10 μm inclusive similarly to the metal wires 33a and 33b. The interval between the first frame wires 57a to 57c is preferably equal to or larger than the width of each of first frame wires 57a to 57c. With such a configuration, lower resistance and invisibility of the first frame wires 57a to 57c can be achieved.

When the interval between adjacent the first frame wires 57a to 57c is caused to be larger than the interval between adjacent the second frame wires 58a to 58e, the wiring density of the first frame wires 57a to 57c can be caused to be smaller than those of the second frame wires 58a to 58e. When the width of each of first frame wires 57a to 57c is caused to be smaller than that of each of second frame wires 58a to 58e, the wiring density of the first frame wires 57a to 57c can be caused to be smaller than those of the second frame wires 58a to 58e.

The resistance of the second frame wires 58a to 58e can be lowered by reducing the interval thereof and increasing the width thereof as compared with the first frame wires 57a to 57c. Also in this case, the second frame wires 58a to 58e are arranged being overlapped on the light shielding layer 36 illustrated in FIG. 14, so that invisibility thereof can be achieved by using the same metal material as those of the metal wires 33a and 33b.

The width of each of second frame wires 58a to 58e may be varied to be gradually increased from an inner peripheral side of the second frame region FA2 toward an outer peripheral side. The second frame wire 58e arranged on the outer peripheral side is coupled to the touch detection electrode TDL at a position distant from the flexible substrate 71 (refer to FIG. 9) as compared with the second frame wire 58a arranged on the inner peripheral side, so that the wire is lengthened. As the length of each of second frame wires 58a to 58e is increased, a resistance value can be prevented from being increased by increasing the width thereof. As illustrated in FIG. 13, each of first frame wires 57a to 57c has the same width. Alternatively, similarly to the second frame wires 58a to 58e, the width of each of first frame wires 57a to 57c may be increased as the wire is arranged closer to the outer peripheral side, that is, the length of the wire is increased.

As described above, by gradually increasing the wiring density from the display region 10a toward the outer circumference of the frame region 10b, the first frame wires 57a to 57c can be prevented from being visually recognized even when the first frame region FA1 is visually recognized when viewed from the oblique direction. The width of the frame region 10b can be reduced because the first frame wires 57a to 57c can be arranged in the first frame region FA1 near the display region 10a. Accordingly, with the display device 1 with a touch detection function according to the present embodiment, the first frame wires 57a to 57c arranged in the frame region 10b can be prevented from being visually recognized while preventing the width of the frame region 10b from being increased.

The first frame wires 57a to 57c and the second frame wires 58a to 58e can be manufactured through the same process by using the same metal material as those of the metal wires 33a and 33b. However, the embodiment is not limited thereto. A metal material different from those of the metal wires 33a and 33b may be used for the first frame wires 57a to 57c and the second frame wires 58a to 58e. When the metal wires 33a and 33b are a laminate obtained by laminating a plurality of metal materials, part of layers of the laminate may be made different. The number of first frame wires 57a to 57c and second frame wires 58a to 58e may be appropriately changed. The number of first frame wires arranged in the first frame region FA1 may be one, or four or more. The number of second frame wires arranged in the second frame region FA2 may be four or less, or six or more.

The touch detection electrode TDL constitutes the mesh-like metal wire by coupling the metal wire 33a with the metal wire 33b. However, the embodiment is not limited thereto, and may be appropriately modified. For example, a pattern may be such that metal wires 33a may be arranged at intervals in the second direction Dy illustrated in FIG. 13.

Second Embodiment

Figure 15:
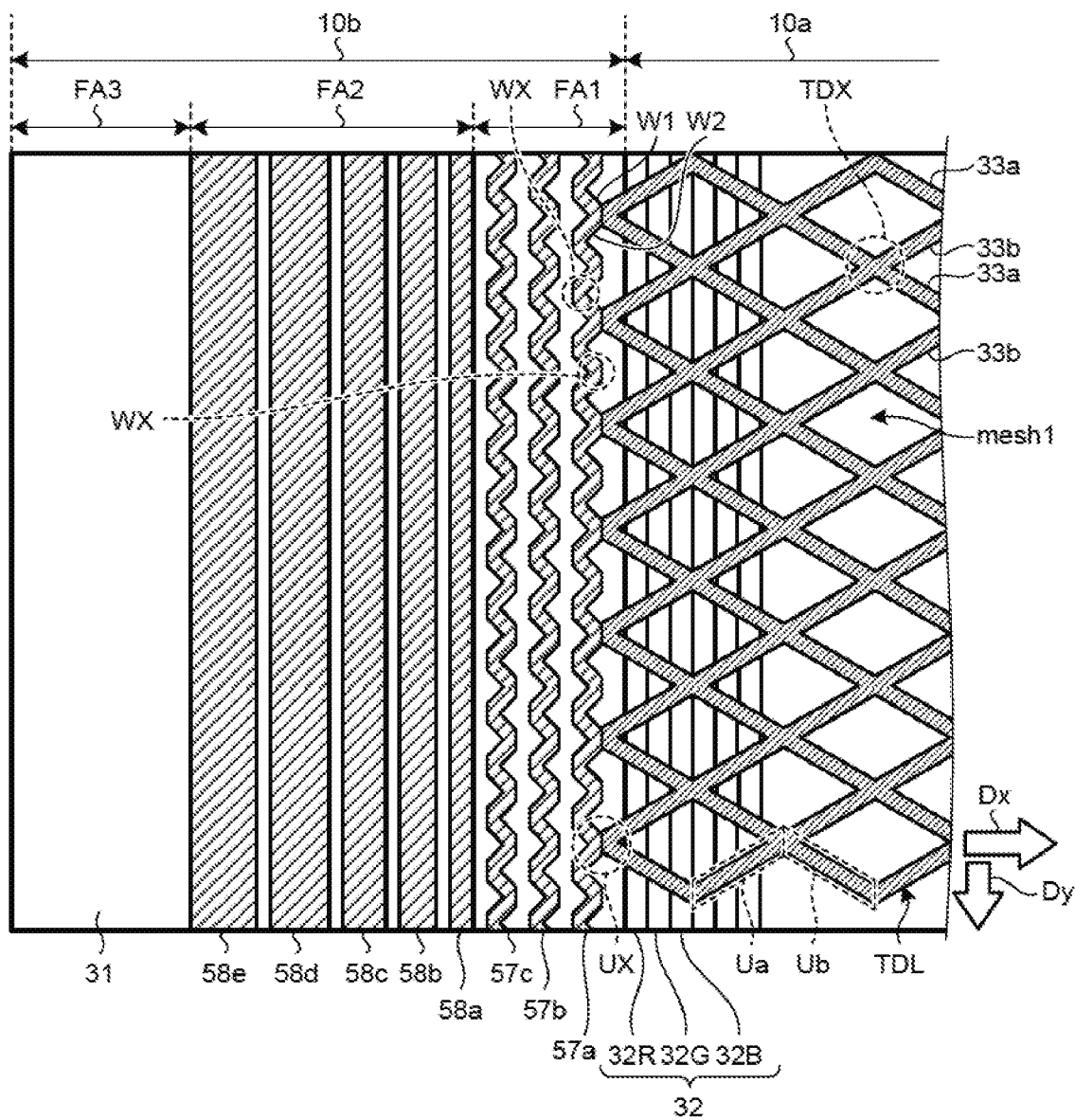
FIG. 15 is a schematic plan view illustrating a touch detection electrode and frame wire of a display device with a touch detection function according to a second embodiment in a partially enlarged manner.

FIG. 15 is a schematic plan view illustrating the touch detection electrode and the frame wire of the display device with a touch detection function according to a second embodiment in a partially enlarged manner. According to the present embodiment, as illustrated in FIG. 15, a pattern of the first frame wires 57a to 57c is different. The first frame wires 57a to 57c include a thin wire piece W1 and a thin wire piece W2. The thin wire piece W1 and the thin wire piece W2 are repeatedly and alternately arranged in the second direction Dy, and bent at a bending part WX to be coupled to each other. In this way, the first frame wires 57a to 57c are formed to be a zigzag line or a wavy line having the bending part WX. The first frame wires 57a to 57c are arranged in parallel with each other at intervals in the first direction Dx.

The bending part WX of the first frame wire 57a and the intersecting part TDX of the metal wires 33a and 33b are coupled to each other at the coupling part UX. Accordingly, the touch detection electrode TDL and the first frame wire 57a are conducted with each other.

Also according to the present embodiment, the wiring density of the first frame wires 57a to 57c in the first frame region FA1 is larger than the wiring density of the metal wires 33a and 33b in the display region 10a. The wiring density of the second frame wires 58a to 58e in the second frame region FA2 is larger than the wiring density of the first frame wires 57a to 57c in the first frame region FA1. Accordingly, the first frame wires 57a to 57c arranged in the frame region 10b can be prevented from being visually recognized while preventing the width of the frame region 10b from being increased.

Each of first frame wires 57a to 57c is formed to be a zigzag line or a wavy line similarly to the metal wires 33a and 33b, so that a pattern of light transmitted through the display region 10a is similar to a pattern of light transmitted through the first frame region FA1. Accordingly, the first frame wires 57a to 57c in the first frame region FA1 can be prevented from being visually recognized even when viewed from the oblique direction.

Figure 16:
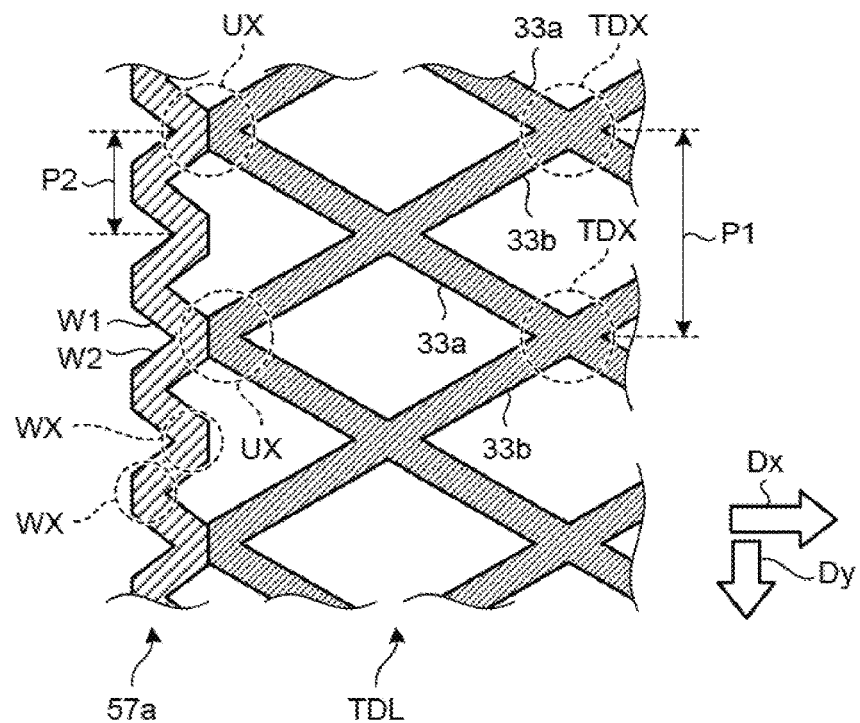
FIG. 16 is a schematic plan view illustrating a coupling portion between the touch detection electrode and the frame wire according to the second embodiment in an enlarged manner.

FIG. 16 is a schematic plan view illustrating a coupling portion between the touch detection electrode and the frame wire according to the second embodiment in an enlarged manner. As illustrated in FIGS. 15 and 16, a pitch P2 of the first frame wire 57a is smaller than a pitch P1 of the metal wires 33a and 33b. As illustrated in FIG. 16, the pitch P1 of the metal wires 33a and 33b is an interval between the intersecting parts TDX adjacent to each other in the second direction Dy. The pitch P2 of the first frame wire 57a is an interval at which the thin wire piece W1 and the thin wire piece W2 are repeatedly arranged, which is an interval at which a plurality of bending parts WX arranged on the first direction Dx side among bending parts WX are adjacent to each other in the second direction Dy. The pitch P2 of the first frame wire 57a according to the present embodiment is half the pitch P1 of the metal wires 33a and 33b. Thus, a plurality of bending parts WX are arranged in the second direction Dy, and the intersecting part TDX of the metal wires 33a and 33b corresponds to one of the bending parts WX. Additionally, the number of the bending parts WX of the first frame wire 57a that can be coupled to the metal wires 33a and 33b can be increased. Accordingly, conduction between the first frame wire 57a and the metal wires 33a and 33b is secured.

Figure 17:
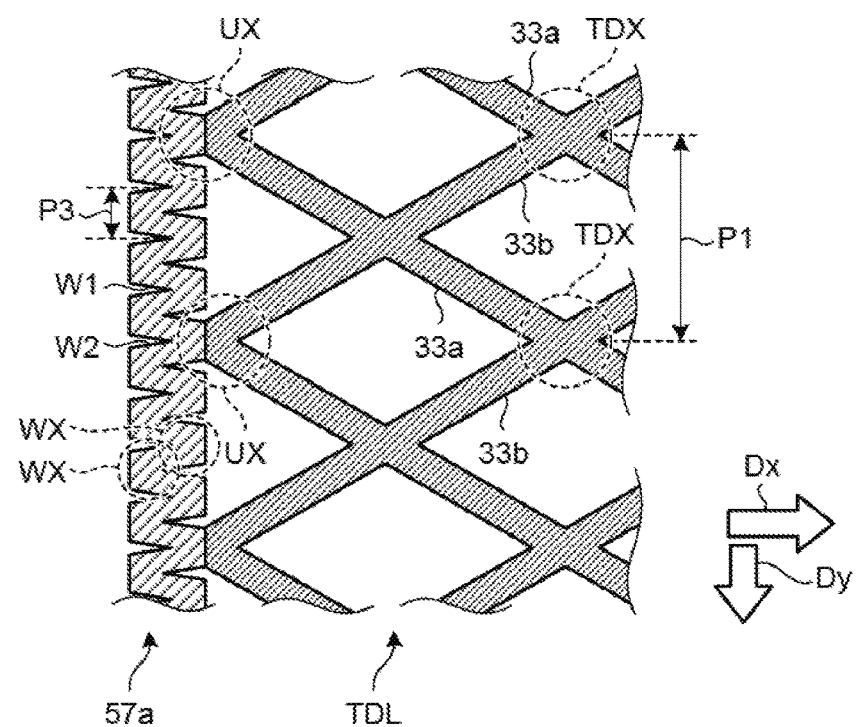
FIG. 17 is a schematic plan view illustrating the coupling portion between the touch detection electrode and the frame wire according to a modification of the second embodiment in an enlarged manner.

FIG. 17 is a schematic plan view illustrating the coupling portion between the touch detection electrode and the frame wire according to a modification of the second embodiment in an enlarged manner. In the modification illustrated in FIG. 17, a pitch P3 of the first frame wire 57a is small, which is quarter the pitch P1 of the metal wires 33a and 33b. An angle formed by the thin wire piece W1 and the thin wire piece W2 coupled to each other illustrated in FIG. 17 is smaller than an angle between the thin wire piece W1 and the thin wire piece W2 illustrated in FIG. 16. That is, a tilt angle of the thin wire piece W1 and the thin wire piece W2 with respect to the first direction Dx is small.

The pitch of the first frame wire 57a is preferably 1/n (n is a natural number) of the pitch P1 of the metal wires 33a and 33b. With such a configuration, a plurality of thin wire pieces W1 and thin wire pieces W2 are arranged in the second direction Dy so that one of the bending parts WX corresponds to the position of the intersecting part TDX of the metal wires 33a and 33b, and thus the first frame wire 57a can be easily coupled to the metal wires 33a and 33b.

Figure 18:
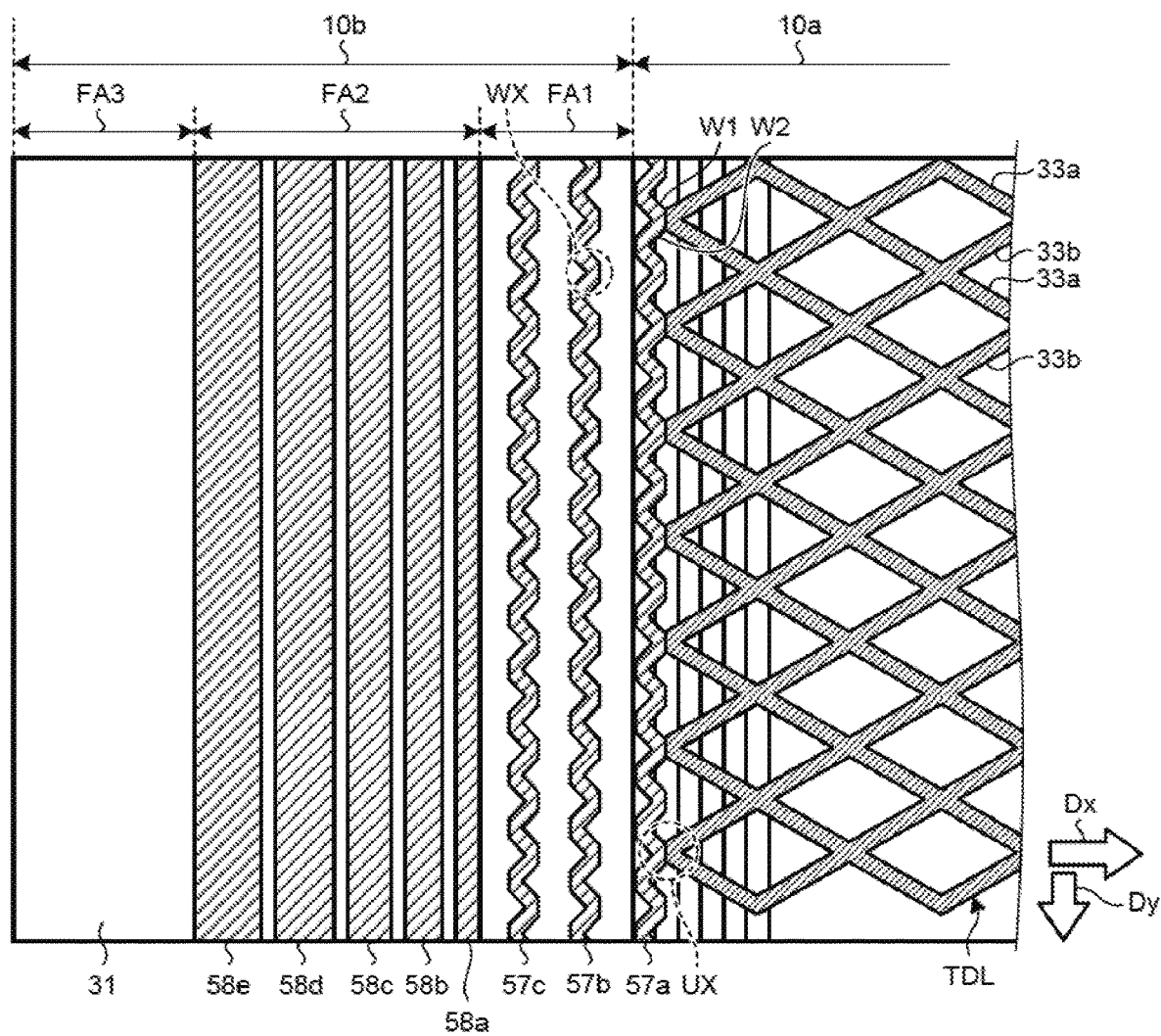
FIG. 18 is a schematic plan view illustrating a touch detection electrode and frame wire of a display device with a touch detection function according to a third embodiment in a partially enlarged manner.

According to the present embodiment, each of first frame wires 57a to 57c is formed to be a zigzag line or a wavy line. Alternatively, the first frame wires 57a to 57c may have a mesh-like pattern. Each of second frame wires 58a to 58e is formed to be a straight line. Alternatively, each of second frame wires 58a to 58e may be formed to be a zigzag line or a wavy line similarly to the first frame wires 57a to 57c Third Embodiment FIG. 18 is a schematic plan view illustrating the touch detection electrode and the frame wires of the display device with a touch detection function according to a third embodiment. According to the present embodiment, the first frame wire 57a is arranged in the display region 10a. The first frame wire 57a is arranged along a boundary between the display region 10a and the frame region 10b on the display region 10a side with respect to the boundary. The first frame wires 57b and 57c are arranged in the first frame region FA1. In the touch detection electrode TDL, ends of the metal wires 33a and 33b are positioned on an inner side (first direction Dx side) than the boundary between the display region 10a and the frame region 10b. The first frame wire 57a and the metal wires 33a and 33b are coupled to each other at the coupling part UX in the display region 10a.

The first frame wire 57a according to the present embodiment is metal wire formed to be a zigzag line or a wavy line in which the thin wire piece W1 and the thin wire piece W2 are repeatedly coupled to each other in the second direction Dy. Thus, the first frame wire 57a arranged in the display region 10a can be made invisible similarly to the metal wires 33a and 33b. By arranging part of the frame wire in the display region 10a near the frame region 10b, the width of the frame region 10b can be reduced.

The thin wire piece W1 and the thin wire piece W2 of the first frame wire 57a are arranged at smaller pitches than those of the metal wires 33a and 33b. Thus, by arranging the first frame wire 57a in the display region 10a, a fringe electric field generated between the first frame wires 57b and 57c and the second frame wires 58a to 58e, and the drive electrode COML (refer to FIG. 7) can be shielded. The fringe electric field will be described later.

Fourth Embodiment

Figure 19:
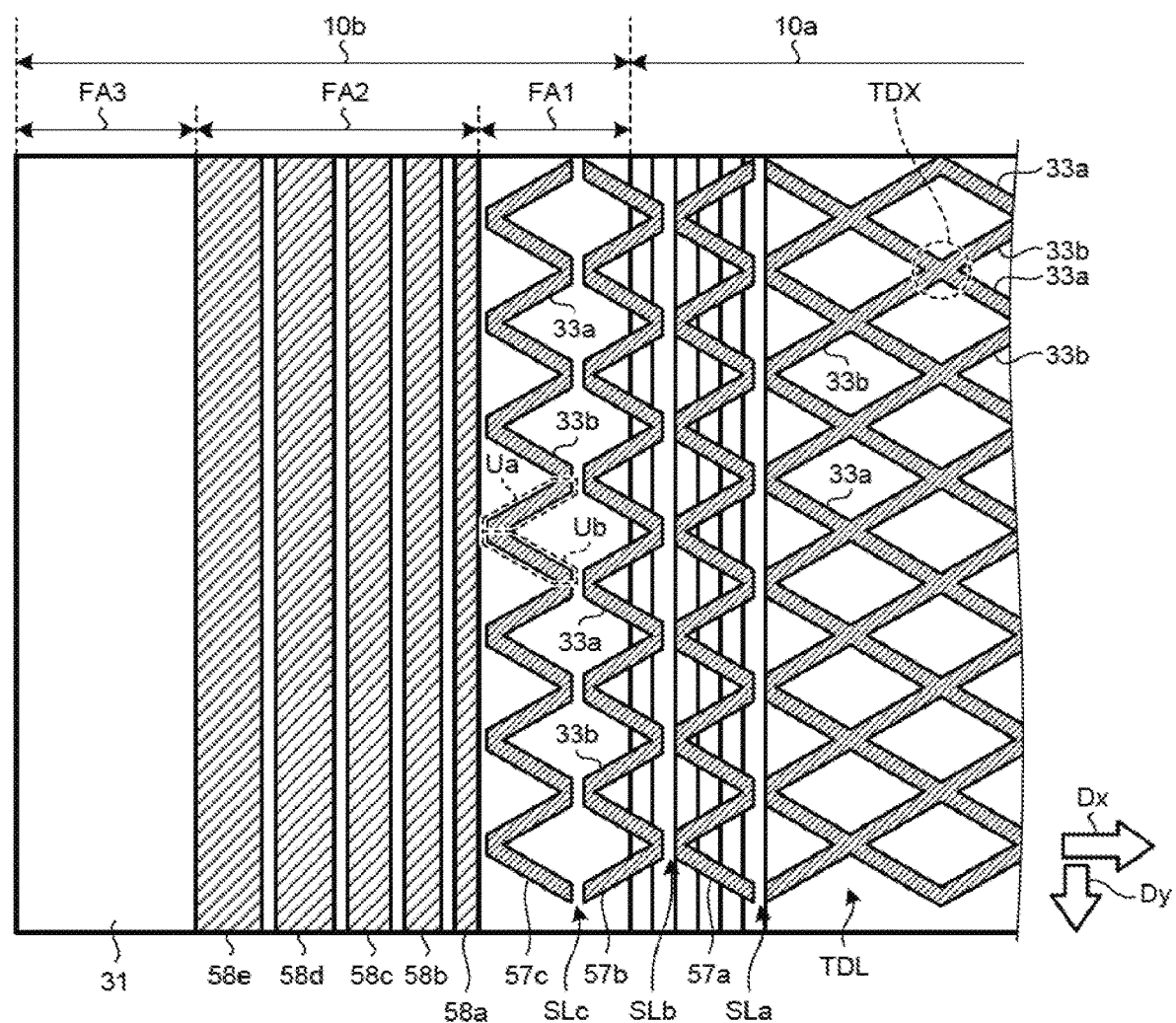
FIG. 19 is a schematic plan view illustrating a touch detection electrode and frame wire of a display device with a touch detection function according to a fourth embodiment in a partially enlarged manner.

FIG. 19 is a schematic plan view illustrating the touch detection electrode and the frame wire according to a fourth embodiment in a partially enlarged manner. Each of first frame wires 57a to 57c is formed to be a zigzag line or a wavy line in which the thin wire piece Ua and the thin wire piece Ub are repeatedly coupled to each other in the second direction Dy. The touch detection electrode TDL is separated from the first frame wire 57a by a slit SLa. The first frame wire 57a is separated from the first frame wire 57b by a slit SLb. The first frame wire 57a and the first frame wire 57b have line symmetry with a straight line parallel with the second direction Dy as a symmetric axis. The first frame wire 57b is separated from the first frame wire 57c by a slit SLc. The first frame wire 57b and the first frame wire 57c have line symmetry with a straight line parallel with the second direction Dy as a symmetric axis.

The first frame wire 57a is arranged in the display region 10a. The first frame wire 57b is arranged across the display region 10a and the first frame region FA1 along the boundary between the display region 10a and the first frame region FA1. The first frame wire 57c is arranged in the first frame region FA1. Part of the first frame wire 57b and the first frame wire 57a are arranged in the display region 10a, so that the width of the frame region 10b can be reduced. The first frame wires 57a and 57b can shield the fringe electric field generated between the drive electrode COML (not illustrated) and the first frame wire 57c, and between the drive electrode COML and the second frame wires 58a to 58e.

The thin wire piece Ua and the thin wire piece Ub of the first frame wires 57a to 57c according to the present embodiment are obtained by separating the metal wires 33a and 33b of the touch detection electrode TDL by the slits SLa, SLb, and SLc in the first direction Dx. That is, each of the thin wire piece Ua and the thin wire piece Ub of the first frame wire 57a has the same width, the same length, and the same tilt angle as those of the thin wire pieces Ua and Ub of the metal wires 33a and 33b of the touch detection electrode TDL. Thus, a value of the wiring density of the first frame wires 57a to 57c is substantially equal to the value of the wiring density of the metal wires 33a and 33b of the touch detection electrode TDL. Due to this, lower resistance and invisibility of the first frame wires 57a to 57c can be achieved similarly to the metal wires 33a and 33b.

As described above, also according to the present embodiment, the first frame wires 57a to 57c arranged in the frame region 10b can be prevented from being visually recognized while preventing the width of the frame region 10b from being increased.

Fifth Embodiment

Figure 20:
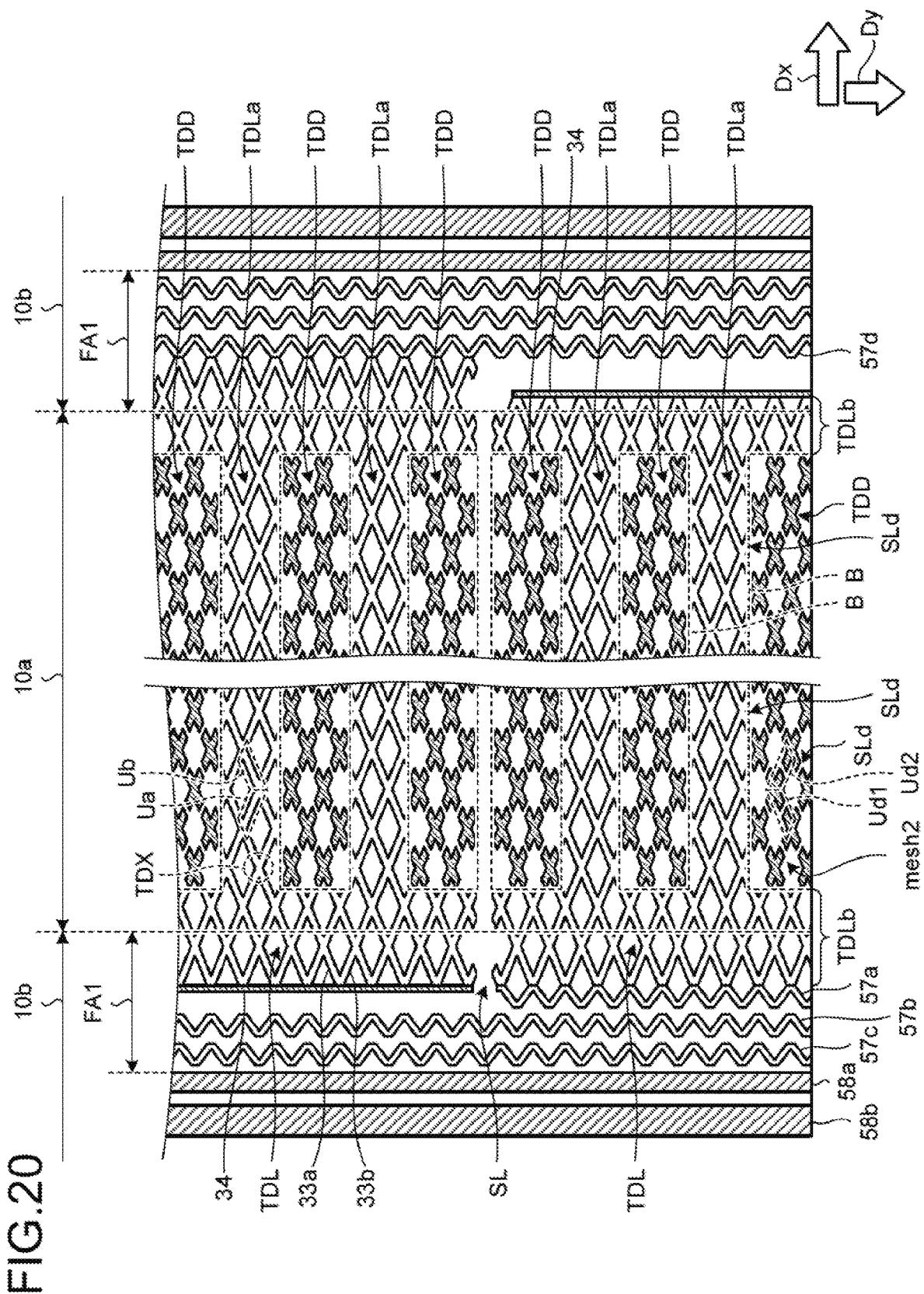
FIG. 20 is a schematic plan view illustrating a touch detection electrode and frame wire of a display device with a touch detection function according to a fifth embodiment.
Figure 21:
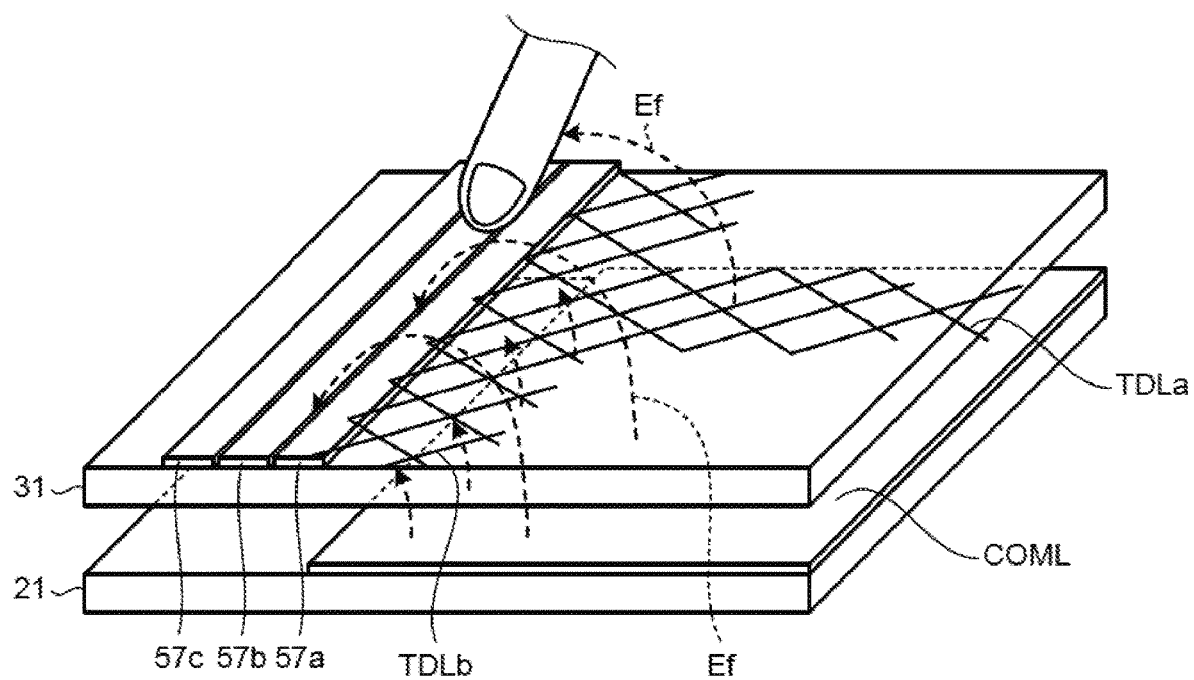
FIG. 21 is a perspective view for schematically explaining a fringe electric field between the drive electrode and the frame wire.

FIG. 20 is a schematic plan view illustrating the touch detection electrode and the frame wire of the display device with a touch detection function according to a fifth embodiment. FIG. 21 is a perspective view for schematically explaining the fringe electric field between the drive electrode and the frame wire.

According to the present embodiment, a dummy electrode TDD not functioning as the touch detection electrode is arranged being separated from the metal wires 33a and 33b of the touch detection electrode TDL. A slit SLd is arranged at a position indicated by the dotted line B in FIG. 20 in the metal wires 33a and 33b, and the dummy electrode TDD is separated from the touch detection electrode TDL. Each dummy electrode TDD has a rectangular shape having a long side in a direction along the first direction Dx, and a plurality of dummy electrodes TDD are arranged in the second direction Dy in one touch detection electrode TDL.

The dummy electrode TDD has metal wire in which a plurality of thin wire pieces Ud1 and thin wire pieces Ud2 are repeatedly coupled to each other in the first direction Dx, and metal wires are coupled to each other in the second direction Dy. The dummy electrode TDD is formed like a mesh having a surrounded region mesh2 surrounded by the thin wire piece Ud1 and the thin wire piece Ud2. The slit SLd is arranged in the middle of each of the thin wire piece Ud1 and the thin wire piece Ud2. Because the dummy electrode TDD is arranged, capacitance between the touch detection electrode TDL and the drive electrode COML (refer to FIG. 11) can be reduced. Light transmittance is substantially the same between a portion where the dummy electrode TDD is arranged and a portion where the touch detection electrode TLD is arranged, so that invisibility of the touch detection electrode TLD can be achieved. The slit SLd may be arranged at an intersecting part of the thin wire piece Ud1 and the thin wire piece Ud2.

The touch detection electrode TDL is divided by the slit SL arranged in the metal wires 33a and 33b, and a plurality of divided touch detection electrodes TDL are arranged in the second direction Dy. FIG. 20 illustrates two of the touch detection electrodes TDL. For example, the touch detection electrode TDL illustrated in an upper part of FIG. 20 is coupled to first coupling wire 57d in the first frame region FA1 on the first direction Dx side. The touch detection electrode TDL illustrated in a lower part of FIG. 20 is coupled to the first coupling wire 57a in the first frame region FA1 opposite to the first direction Dx. Coupling wire 34 for coupling the metal wires 33a and 33b with each other is coupled to each side of the touch detection electrode TDL to which the first coupling wires 57a and 57d are not coupled.

The touch detection electrode TDL includes a first portion TDLa and a second portion TDLb. The first portion TDLa extends in the first direction Dx, and is arranged between the dummy electrodes TDD arranged in the second direction Dy. Second portions TDLb are arranged at both ends of the touch detection electrode TDL, and each extend in the first direction Dx. The second portion TDLb is arranged along the boundary between the display region 10a and the first frame region FA1. The first portion TDLa is arranged between the second portions TDLb arranged at both ends, and the first portion TDLa is coupled to the second portion TDLb. The first portion TDLa mainly functions as the touch detection electrode in the principle of mutual capacitance touch detection described above.

When the first frame wires 57a to 57c and the second frame wires 58a to 58e (part thereof is not illustrated) are arranged in the frame region 10b near the display region 10a, as illustrated in FIG. 21, a fringe electric field Ef is generated between the drive electrode COML and the first frame wires 57a to 57c. Although FIG. 21 illustrates the first frame wires 57a to 57c, the fringe electric field Ef is also generated between the drive electrode COML and the second frame wires 58a to 58e each having a larger area (not illustrated in FIG. 21). When a conductor such as a finger is in contact with or proximate to the first frame wires 57a to 57c, the capacitance varies because the fringe electric field Ef is shielded. This variation in capacitance may cause erroneous detection.

The second portion TDLb is arranged according to the present embodiment, so that the second portion TDLb functions as a shield that shields the fringe electric field Ef between the drive electrode COML and the first frame wires 57a to 57c. Thus, the fringe electric field Ef can be reduced to prevent erroneous detection. The second portion TDLb functions as both the shield and the touch detection electrode that detects a finger and the like being in contact with or proximate to the second portion TDLb.

The first frame wires 57a to 57c are arranged in the first frame region FA1 in FIG. 20. As illustrated in FIG. 18, when the first frame wire 57a having a small pitch is arranged in the display region 10a, effect of shielding the fringe electric field Ef is improved. Similarly to FIG. 19, an end of the second portion TLDb may be utilized as the frame wire. In this case, a slit may be arranged for separating the end of the second portion TLDb in the first direction Dx to obtain the frame wire in which the thin wire piece Ua and the thin wire piece Ub are repeatedly coupled to each other in the first direction Dx. By utilizing part of the second portion TLDb as the frame wire, the fringe electric field Ef can be shielded and the width of the frame region 10b can be reduced.

Sixth Embodiment

Figure 22:
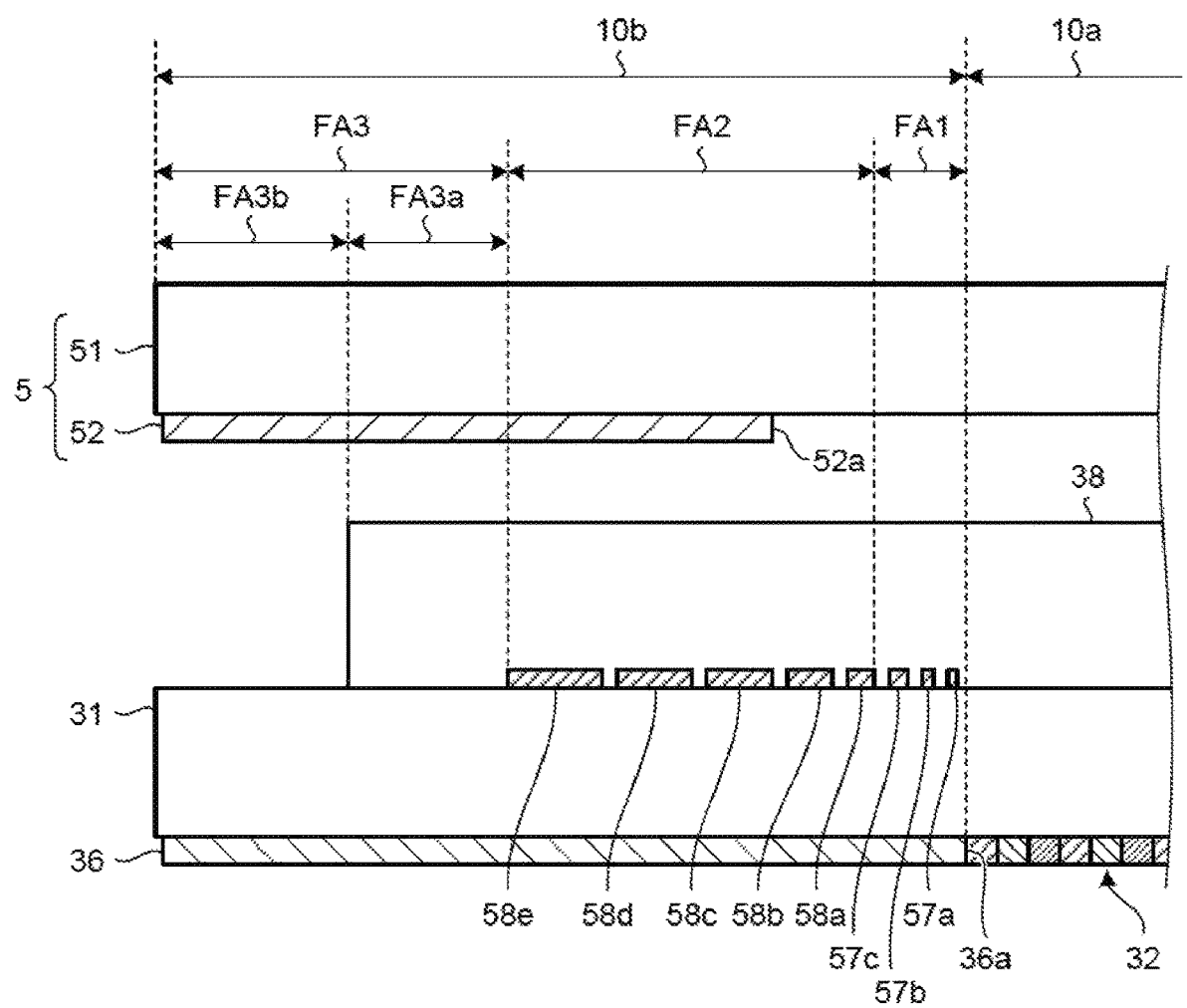
FIG. 22 is a schematic cross-sectional view of a display device with a touch detection function according to a sixth embodiment.

FIG. 22 is a schematic cross-sectional view of the display device with a touch detection function according to a sixth embodiment. According to the present embodiment, a covering member 5 is arranged above the glass substrate 31. The covering member 5 is arranged at a position overlapping with the pixel substrate 2 and the counter substrate 3 (refer to FIG. 7), and covers the entire display region 10a and frame region 10b.

The covering member 5 includes a cover base material 51 and a coloring layer 52. The cover base material 51 is a protecting member for covering and protecting the pixel substrate 2 and the counter substrate 3. The cover base material 51 may be a glass substrate, or a film-like base material made of a resin material and the like. The coloring layer 52 is arranged on a face of the cover base material 51 facing the glass substrate 31. The coloring layer 52 is arranged in a region overlapping with the frame region 10b. Because the coloring layer 52 is arranged, circuits such as the gate driver 12 and the drive electrode driver 14, the frame wire, the flexible substrates 71 and 72, and the like (refer to FIGS. 8 and 9) can be prevented from being visually recognized from the outside. The coloring layer 52 is made of, for example, a resin material colored to suppress light transmission or a metal material.

The first frame wires 57a to 57c according to the present embodiment have the same configuration as those of the first to the fourth embodiments described above. The wiring density of the first frame wires 57a to 57c is smaller than the wiring density of the second frame wires 58a to 58e. Thus, the first frame wires 57a to 57c can be prevented from being visually recognized even when viewed from the oblique direction. The first frame wires 57a to 57c and the second frame wires 58a to 58e include the same metal material as those of the metal wires 33a and 33b of the touch detection electrode TDL described above (not illustrated in FIG. 22). The light shielding layer 36 is arranged on the lower surface of the glass substrate 31. The first frame wires 57a to 57c and the second frame wires 58a to 58e have a color similar to that of the light shielding layer 36, so that invisibility thereof is achieved even when the wires are viewed from above.

The coloring layer 52 of the covering member 5 covers the third frame region FA3 and part of the second frame region FA2, and an end 52a of the coloring layer 52 on the display region 10a side is overlapped on the second frame region FA2. Part of the second frame region FA2 closer to the display region 10a with respect to the end 52a and the first frame region FA1 are not covered by the coloring layer 52. In this way, invisibility can be achieved as described above even when the first frame wires 57a to 57c and the second frame wires 58a and 58b are not covered by the coloring layer 52.

If the coloring layer 52 is arranged to cover the entire frame region 10b, the coloring layer 52 needs to be arranged being expanded to the display region 10a considering misregistration in applying and forming the coloring layer 52 by printing and the like and an error in lamination of the covering member 5. Due to this, the width of the frame region 10b is possibly increased. According to the present embodiment, the first frame wires 57a to 57c and the second frame wires 58a and 58b can be made invisible, so that the coloring layer 52 can be arranged in part of the frame region 10b. Accordingly, the width of the frame region 10b can be reduced.

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, described is a case in which the drive electrode also functions as the common electrode of the display panel, but the embodiment is not limited thereto. Alternatively, the display device with a touch detection function may be configured such that the common electrode is arranged in the display panel, and the touch panel is mounted on the display panel. Although mutual capacitance touch detection has been described above, self capacitance touch detection using the touch detection electrode may be employed. For example, the touch detection electrode may be configured such that a plurality of small electrode parts including metal wire are arranged in a matrix in the display region, and each of the small electrode parts performs self capacitance touch detection. In this case, the frame wire is coupled to each of the small electrode parts to be arranged in the frame region.

The touch detection electrode includes the metal wire. Alternatively, for example, the touch detection electrode may be a translucent conductive material such as ITO. Also in this case, by configuring the first frame wire and the second frame wire as described in the embodiments, the frame region can be made invisible while preventing the width of the frame region from being increased.

What is claimed is:

1. A detection device comprising:
a plurality of detection electrodes running in a first direction; and
a plurality of frame wires coupled to the detection electrodes and running in a second direction intersecting the first direction, wherein
at least one of the frame wires is a zigzag line having a frame wire pitch or a wavy line having the frame wire pitch,
each of the detection electrodes has detection electrode bending parts facing the zigzag line or the wavy line,
each of the detection electrode bending parts is a part of an outer circumference of the detection electrodes and protrudes toward the zigzag line or the wavy line,
the detection electrode bending parts are arranged at a bending part pitch, and
the frame wire pitch is smaller than the bending part pitch,
the zigzag line or the wavy line has frame wire bending parts facing the detection electrode bending parts, and
the detection electrode bending parts included in one of the detection electrodes are connected to the zigzag line or the wavy line of one of the frame wires only at the frame wire bending parts.

2. The detection device according to claim 1, wherein the detection electrode bending parts are arranged in the second direction.

3. The detection device according to claim 1, wherein the frame wire pitch is 1/N of the bending part pitch, where N represents a natural number.

4. The detection device according to claim 1, wherein the frame wire bending parts include:
first frame wire bending parts each of which is connected to each of the detection electrode bending parts included in one of the detection electrodes; and
second frame wire bending parts that are not connected to the detection electrode bending parts.

5. The detection device according to claim 1, wherein
each of the detection electrodes has a mesh pattern including first wires, second wires intersecting the first wires, and opening regions, and
each of the opening regions is surrounded by two of the first wires adjacent to each other and two of the second wires adjacent to each other.

6. A detection device comprising:
a plurality of detection electrodes running in a first direction; and
a plurality of frame wires coupled to the detection electrodes and running in a second direction intersecting the first direction, wherein
the frame wires include a first frame wire that is the closest to the detection electrodes of all the frame wires,
the first frame wire is a zigzag line having a frame wire pitch or a wavy line having the frame wire pitch,
one of the detection electrodes has a zigzag electrode portion facing the first frame wire,
the zigzag electrode portion is a part of an outer circumference of the one of the detection electrodes and protrudes toward the zigzag line,
the zigzag electrode portion has a first pitch,
the frame wire pitch is not more than the first pitch,
the zigzag electrode portion includes detection electrode bending parts arranged in the second direction, and
the detection electrode bending parts are connected to the first frame wires.

7. The detection device according to claim 6, wherein
the zigzag line or the wavy line includes a portion facing the zigzag electrode portion in the first direction, and
the portion and the zigzag electrode portion have line symmetry.

8. The detection device according to claim 6, wherein the zigzag line or the wavy line has a same width as a width of the zigzag electrode portion.

9. The detection device according to claim 6, wherein
the frame wires further include a second frame wire adjacent to the first frame wire,
the second frame wire has a zigzag line,
the first frame wire is located between the second frame wire and the one of the detection electrodes, and
the zigzag line of the first frame wire and the zigzag line of the second frame wire have line symmetry.

10. A detection device comprising:
a plurality of detection electrodes running in a first direction; and
a plurality of frame wires coupled to the detection electrodes and running in a second direction intersecting the first direction, wherein
at least one of the frame wires is a zigzag line having a frame wire pitch or a wavy line having the frame wire pitch,
each of the detection electrodes has detection electrode bending parts facing the zigzag line or the wavy line,
each of the detection electrode bending parts is a part of an outer circumference of the detection electrodes and protrudes toward the zigzag line or the wavy line,
the detection electrode bending parts are arranged at a bending part pitch, and the frame wire pitch is smaller than the bending part pitch,
the zigzag line or the wavy line has frame wire bending parts facing the detection electrode bending parts,
the frame wire bending parts include:
first frame wire bending parts each of which is connected to each of the detection electrode bending parts included in one of the detection electrodes; and
second frame wire bending parts that are not connected to the detection electrode bending parts.

11. The detection device according to claim 10, wherein the detection electrode bending parts are arranged in the second direction.

12. The detection device according to claim 10, wherein the frame wire pitch is 1/N of the bending part pitch, where N represents a natural number.

13. The detection device according to claim 10, wherein each of the detection electrodes has a mesh pattern including first wires, second wires intersecting the first wires, and opening regions, and each of the opening regions is surrounded by two of the first wires adjacent to each other and two of the second wires adjacent to each other.

* * * * *